(12) United States Patent
Kulas

(10) Patent No.: US 8,584,563 B1
(45) Date of Patent: Nov. 19, 2013

(54) TRIGONOMETRIC SAW-CUT CENTERING JIG ASSEMBLY

(76) Inventor: Timothy James Kulas, Verona, WI (US)

( * ) Notice: Subject to any disclaimer, the term of this patent is extended or adjusted under 35 U.S.C. 154(b) by 452 days.

(21) Appl. No.: 12/840,085

(22) Filed: Jul. 20, 2010

(51) Int. Cl.
B27B 11/02 (2006.01)
B26D 1/46 (2006.01)

(52) U.S. Cl.
USPC .............................. 83/441.1; 83/829; 83/444

(58) Field of Classification Search
USPC .............. 83/441.1, 446, 444, 435.12, 435.13, 83/440.2, 447, 448, 450, 829; 144/253.8, 144/253.9, 253.91, 253.4
See application file for complete search history.

(56) References Cited

U.S. PATENT DOCUMENTS

| | | | | |
|---|---|---|---|---|
| 2,722,247 A | * | 11/1955 | Schroeder et al. | 83/446 |
| 3,410,324 A | * | 11/1968 | Thompson | 83/441.1 |
| 4,002,329 A | * | 1/1977 | Petrowski | 269/318 |
| 4,592,400 A | * | 6/1986 | Graham | 144/117.3 |
| 4,603,612 A | * | 8/1986 | Atkins | 83/425 |
| 4,608,898 A | * | 9/1986 | Volk | 83/745 |
| 4,651,606 A | | 3/1987 | Hurwitz | |
| 5,016,508 A | | 5/1991 | Hallenbeck | |
| 5,148,730 A | * | 9/1992 | McCaw | 83/745 |
| 5,165,458 A | | 11/1992 | Hirsch | |
| 5,182,975 A | * | 2/1993 | Warner | 83/745 |
| 5,367,933 A | * | 11/1994 | Jaksha | 83/440.2 |
| 5,472,029 A | * | 12/1995 | Ketch | 144/371 |
| 5,492,160 A | | 2/1996 | McCracken | |
| 5,598,878 A | | 2/1997 | Wirth et al. | |
| 6,250,349 B1 | * | 6/2001 | Crofutt | 144/253.5 |
| 6,446,687 B1 | * | 9/2002 | Jukoff | 144/253.6 |
| D481,402 S | | 10/2003 | Jenkins et al. | |
| 6,672,190 B2 | * | 1/2004 | Taylor | 83/435.14 |
| 7,140,286 B2 | * | 11/2006 | Schwartz | 83/446 |
| 7,266,800 B2 | | 9/2007 | Sezginer | |
| 7,735,403 B2 | | 6/2010 | Oberheim et al. | |
| 2005/0005754 A1 | * | 1/2005 | Coderre | 83/446 |
| 2005/0241450 A1 | * | 11/2005 | Schwartz | 83/446 |
| 2006/0123962 A1 | * | 6/2006 | Fontaine | 83/446 |
| 2008/0277024 A1 | * | 11/2008 | Kozina et al. | 144/253.6 |
| 2010/0251870 A1 | * | 10/2010 | Wilson | 83/829 |
| 2010/0307302 A1 | * | 12/2010 | Smith | 83/13 |

* cited by examiner

Primary Examiner — Omar Flores Sanchez
(74) Attorney, Agent, or Firm — Lloyd W. Bonneville

(57) ABSTRACT

An assembly is used upon a powered saw table to accurately cut at a centerline of a workable piece or other material to be cut or, if desired, to accurately cut the cheeks of a tenon to fit a mortise. The trigonometric functions of a right triangle—sine and cosine—are used to assure that as a component of the assembly is moved a certain distance longitudinally, parallel the cutting direction of the saw blade, the guide fence is moved just one-half that distance toward the blade. The longitudinal distance moved is made to equal the width of the piece, thereby indicating a centerline. If the width of the mortise is also considered in addition as part of the longitudinal distance moved, the guide fence is moved toward the saw blade just one-half the distance of the combined widths of the piece and the mortise, to cut the tenon cheeks.

20 Claims, 17 Drawing Sheets

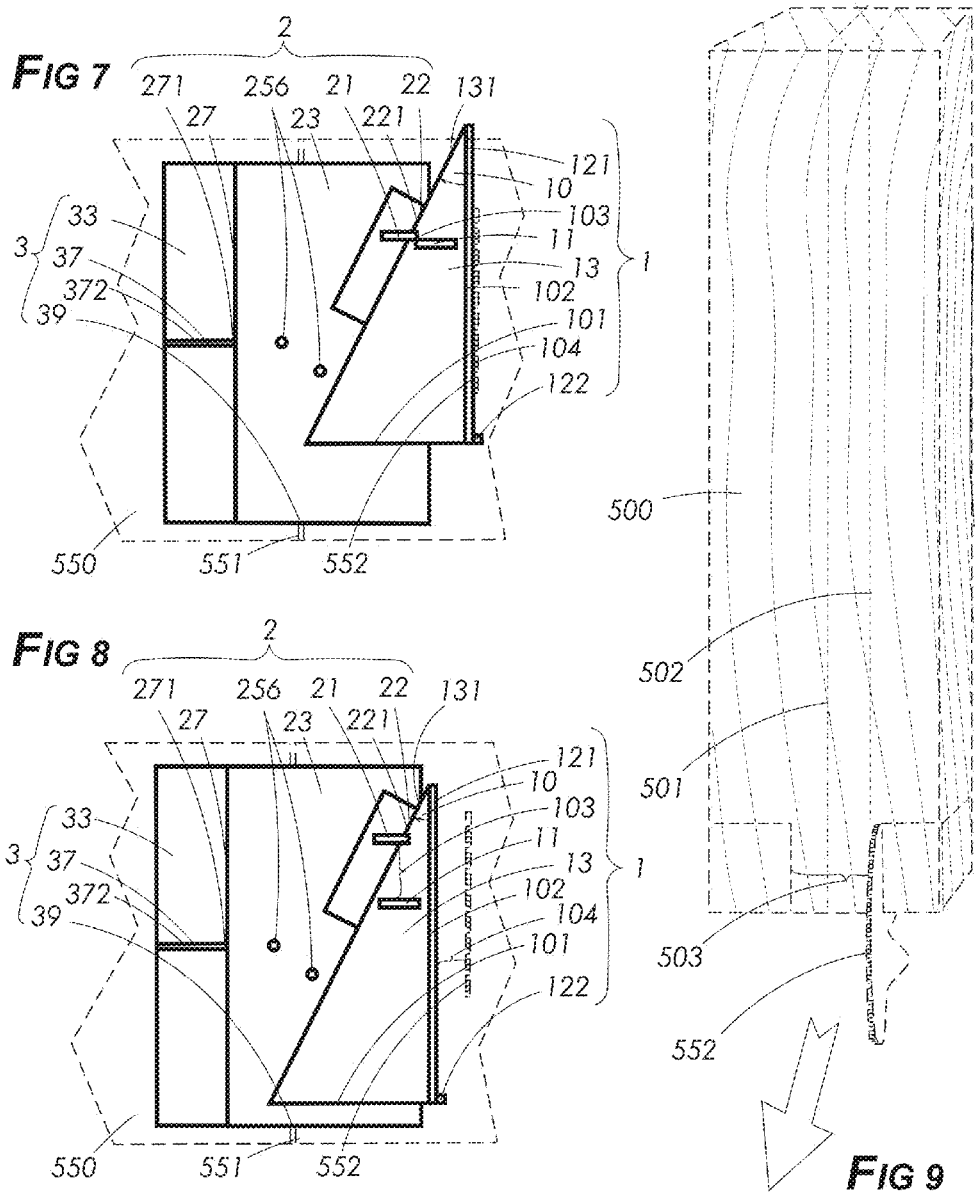

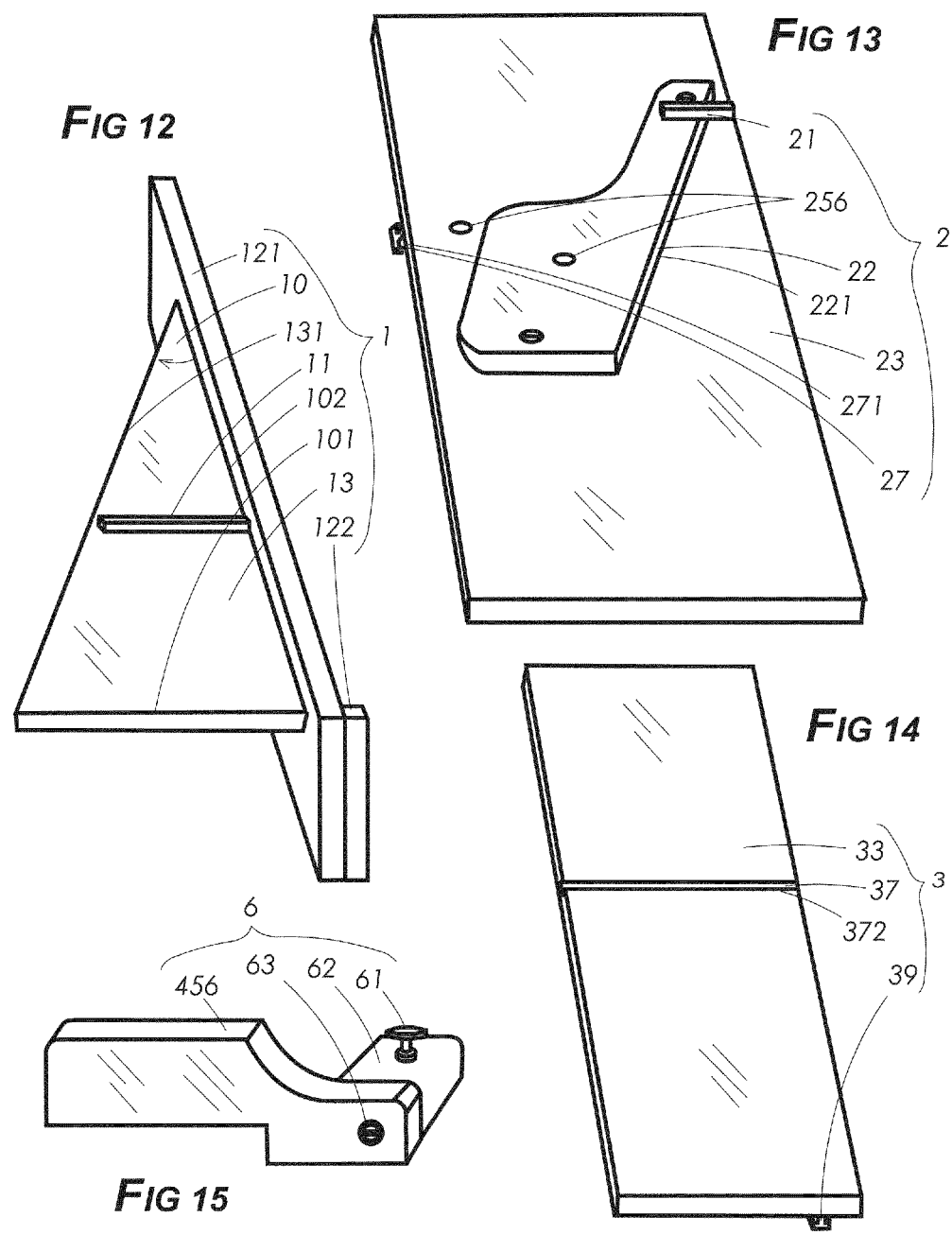

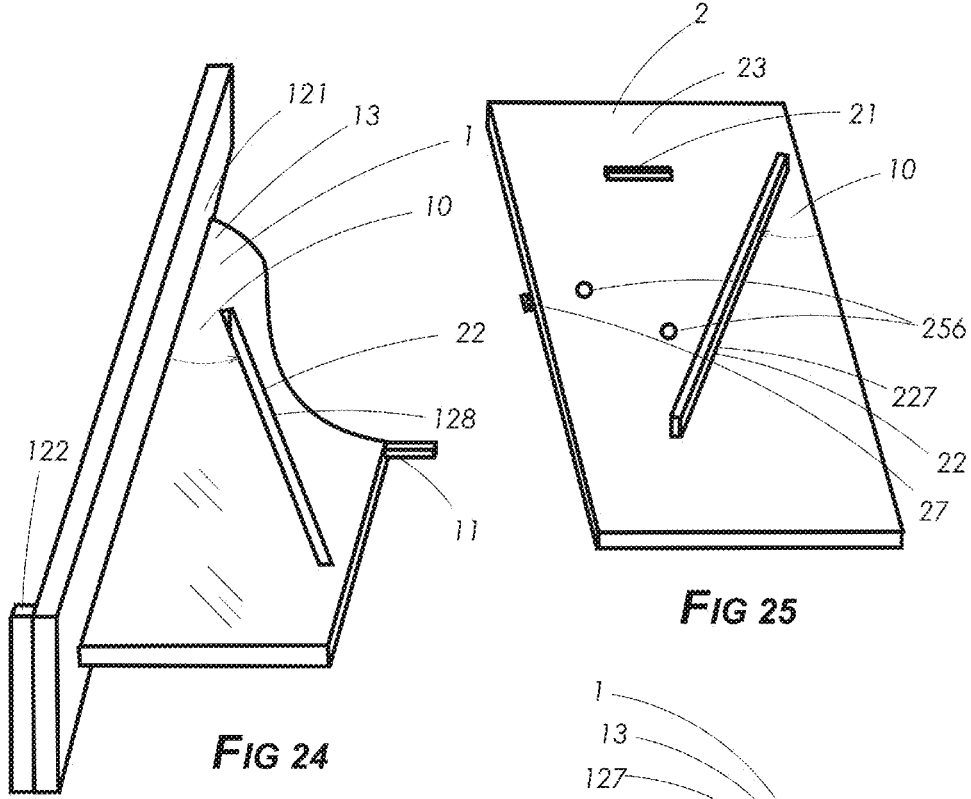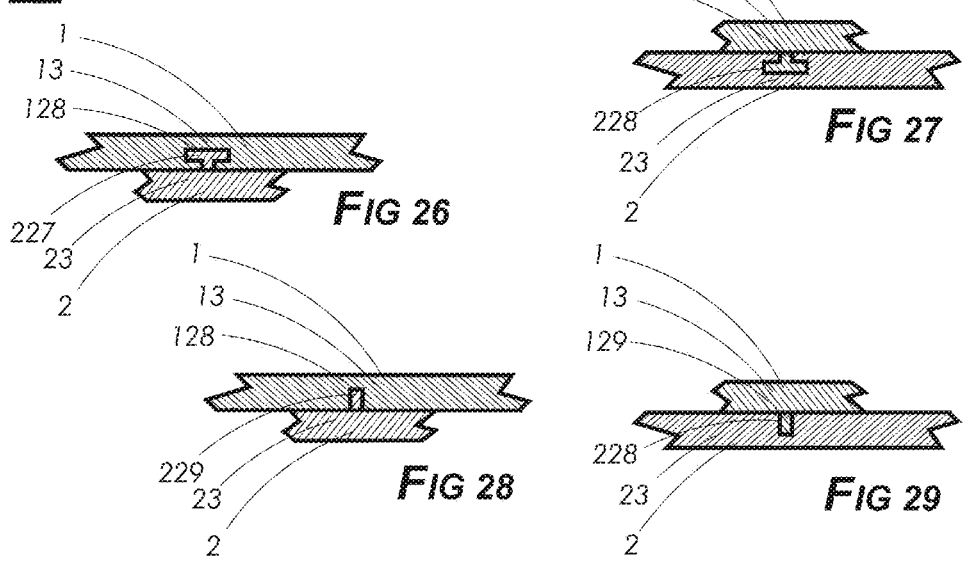

TRIGONOMETRIC SAW-CUT CENTERING JIG ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

Carpentry or workshop appliances

2. Description of Related Art

Occasionally a descriptive term in this application may be shortened so as to recite only a part rather than the entirety thereof as a matter of convenience or to avoid needless redundancy. In instances in which that is done, applicant intends that the same meaning be afforded each manner of expression. Thus, the term vertically pivotable spacer (61) might be used in one instance but in another, if meaning is otherwise clear from context, expression might be shortened to pivotable spacer (61) or merely spacer (61). Any of those forms is intended to convey the same meaning.

The term attach or fasten or any of their forms when so used means that the juncture is of a more or less permanent nature, such as might be accomplished by nails, screws, welds or adhesives. Thus it is stated herein that the assembly's moveable curb (11) is attached to the surface of the moveable component's plate-like body (13). Employment of the words connector join or any of their forms is intended to include the meaning of any of those terms in a more general way. The term emplace describes a relationship between two objects in which one is merely positioned upon or within the other from which it may be readily removed. Thus, it is explained that the workable piece (500) is emplaced between the moveable and fixed curbs (11 and 21, respectively) for measuring adjustment purposes. The term rigid attachment denotes a connection in which the juncture between assembly parts permits removal only with some degree of difficulty. Such is described as the interconnection of the displacement accommodating component's longitudinal translation rail (99) with the saw table's longitudinal translation channel (551).

The word comprise may be construed in any one of three ways herein. A term used to describe a given object is said to comprise it, thereby characterizing it with what could be considered two-way equivalency in meaning. Thus, it is stated that the distance the moveable component (1) is advanced or withdrawn parallel the saw blade's (552) cutting plane manifests a longitudinally disposed vector comprising the first side of a triangle, meaning that the latter is in fact the former and the former, the latter. The term comprise may also be characterized by what might be considered one-way equivalency, as when it is stated herein that any one of several forms—an angled abutment ridge (221), for example—may comprise the assembly's angle determinant means (22). This use of the word has a generic sense to it. That is, an angled abutment ridge (221) will always be the angle determinant means (22) but the angle determinant means (22) may be an angled abutment ridge (221) in one case but something else— an angled rail and channel assembly (222), for instance—in another. However, the word comprise may also be used to describe a feature which is part of the structure or composition of a given object. Thus, it is said the fixed component (2) comprises lateral translation means (27) to laterally position the fixed component (2) upon the displacement accommodating component (3). The meaning in the respective cases is clear from context, however. Accordingly, modifying words to clarify which of the three uses is the intended one seem unnecessary.

Terms relating to physical orientation such as upper, upon, upward, downward, overlying or underlying, refer to the positioning of an object in the manner in which it would be typically oriented for use or viewing. Thus, the terms distal, with reference to an interior angle of a triangle, and proximal, for the locus of another interior angle, with reference to the guide fence (121) it is near, are positions observed from the perspective of the powered table saw operator. Similarly, the disposition of the vertical centerline (501) of a workable piece (500) refers to its (501) orientation as it (501) approaches the saw blade (552) for cutting. Advancement and withdrawal of the moveable component (1) parallel the saw blade's (552) cutting plane presuppose that the blade (552) of a table saw rotates in a particular plane and designates movement in a longitudinal direction, while movement transverse to that is described as lateral, bearing in a direction at right angles to the longitudinal. The width of the workable piece (500) is a selected dimension thereof, identifying the face thereof (500) which is being cut into by the saw blade (552). These terms of orientation should be interpreted to represent respective aspects or dispositions of members of the assembly in a consistent manner—even if it were, for example, considered positioned upside down in certain instances.

The term mated, with reference to various rail (39, 64, 99, 127, 227, 871 and 971) and channel (65, 128, 228, 551, 872 and 972) arrangements denote a fitted co-relationship, permitting one to slide freely along with reference to the other each remaining secure in its interconnection with the other. Rail (39, 64, 99, 127, 227, 871 and 971) and channel (65, 128, 228, 551, 872 and 972) pairs suggest translation systems permitting such free unrestricted movement in a given direction, the word translation referring to the repositioning of an object from one place to another.

The term angularly and related expressions sharing the same word root indicates extension in other than a transverse manner with reference to its base of origin. The term right triangularly configured describes a particular triangle wherein two sides are transverse one another comprising an angle between them as a right angle. A triangle may be considered in an abstract sense comprising sides which though not physically observable or present, may be said to manifest vectors of directional force or movements. This abstract visualization, quite common in fields of science such as physics, is useful in understanding either the way in which a given force or movement may be analyzed in terms of the combined or net effect of two individual components disposed or may be said to be manifested at a angle to one another; or conversely, the manner in which the two angularly disposed individual components may be considered in terms of their combined or net effect.

While the inventive assembly hereof is considered in terms of cutting operation upon a wood piece (500), there are other materials within which a mortise and tenon (503) might be formed. The term "workable piece" (500) is, therefore, used herein to address that fact. While a mortise may be prepared by various alternative means—often with a cutting tool known as a router, it has become a common practice to carve one out by means of a drill-bit-chisel, a devise operated upon a drill press. The drill-bit-chisel comprises a drill-bit housed within a durable framework of cutting chisel-like edges and is loaded upon the drill press in the usual manner of doing so for any drill bit intended for use. By operation of the drill press, this devise is caused to move in the intended manner to cut out the mortise. The width of the mortise, thus, may properly be considered to equal that of the drill-bit-chisel devise.

In using a table saw, for reasons of safety and convenience, a left-handed operator takes a position different from that of a right-handed operator. The right-handed operator positions himself or herself to the left of the saw blade (552) with the guide fence (121) intermediately disposed, using his or her right hand to push the workable material (500) through for cutting. Work assemblies or jigs of various sorts are emplaced with a rail seated for longitudinal running along one of the saw table's longitudinal translation—or miter—channels (551). One such channel (551) is disposed to the left of the saw blade (552), the other (551) to the right. The operator selects one (551) or the other (551) for emplacement of the particular apparatus he or she is using, depending upon his or her right-handedness or left-handedness.

The tenon (503) is a tongue-like projection formed to fit the mortise to join—usually transversely—two workable pieces. It comprises two shoulders, one to each side of the tongue-like projection. Consider, for instance three lengths of wood placed adjacent one another to form a unified structure such that the middle one is longer than the other two, sticking out from the ends of the two other pieces. The combination may be considered a tenon and the ends of the shorter pieces, the shoulders of the tenon with the sides of the tongue-like projection extending upwardly from the shoulders to comprise the tenon's cheeks. As a matter of orientation, a view of the workable piece (500) from the side exhibiting what will be cut to form both the tongue-like projection and the shoulders is herein designated the face of the workable piece (500) comprising it. As an incidental matter, of course, the oppositely disposed or reverse side to the piece (500) comprises the same configuration.

The preparation of a tenon (503) to precisely fit the mortise is a well known challenge in workshop art. One might emplace a workable piece (500) for cutting with its (500) face down upon the saw table (552) to cut the tenon's (503) cheeks, in which case, by reason of the circumferential roundness of the saw blade (552), each cut would leave an untidy over-cutting groove at the end thereof. The same undesirable result would occur upon thereafter cutting the shoulders. Alternatively, one might turn the workable piece (500), holding its (500) length upright so as to emplace the workable piece (500) so that the face is advanced toward the saw blade (552) for cutting. Although a bit more cumbersome in that some degree of skill is required to assure the piece (500) is held straightly upright in running it (500) through the saw blade (552), this technique is preferred by many. By employing it in cutting the tenon's (503) cheeks, the saw blade (552) passes all the way through the workable piece (500), leaving no untidy ends to the cuts. The piece (500) may be emplaced so as to lie flatly on the saw table (550) in cutting the shoulders.

Some tenon (503)—mortise arrangements may comprise a mortise cut as a straight-through opening in the workable piece comprising the mortise, in which case the tenon (503) formed to fit it requires a second pair of transversely disposed cheeks. For this construction, the same procedure adopted for the first pair of cheeks is followed in cutting the second.

There are few instances in the prior art relying directly upon trigonometric functions in matters of carpentry or workshop assemblies. Jigs employing trigonometry to more efficiently form an angled miter with a powered table saw have appeared but they have little material bearing upon the matters addressed herein. Exemplary are U.S. Pat. No. 4,651,606 issued to Hurwitz, introducing a miter cutting frame which could be used either top side up or upside down; U.S. Pat. No. 5,016,508 issued to Hallenbeck providing for a framework dedicated to that end which comprised angularly arranged pivotable members; and U.S. Pat. No. 5,165,458 issued to Hirsch addressing an assembly wherein the saw cutting fence could be set at varying angles to the saw cutting plane; U.S. Pat. No. 5,492,160 issued to McCracken provided an assembly which aided the forming of a tenon (503) but merely addressed the function of retaining the workable piece (500) in place during the cutting work put upon it (500). U.S. Pat. No. 5,598,878 issued to Wirth comprised an arrangement employing a template which could be set upon the workable piece (500) to assure it (500) was properly cut. U.S. Pat. No. Des. 481,402 s issued to Jenkins is essentially to the same effect. Those references address enhanced operational cutting itself. Moreover, in those cases, as in numerous others, it was necessary to mark a cutting line with a pencil or other scribing tool, an undertaking which might be made unnecessary with a properly designed assembly. U.S. Pat. No. 7,735,403 issued to Oberheim and the references cited by it employ laser beams to indicate either alignment or a cutting path for the saw blade (552) in which the laser beam is merely substituted for the pre-marked pencil line. None of those appear to have dealt with innovative means to perform what might be considered to be pre-setting measurement independent of the cutting instrument but, nevertheless, indirectly influencing the manner and precision of its operation.

It is true there have been developed pattern processes which do influence operation from an independent site. Such was the case in U.S. Pat. No. 7,266,800 issued to Sezginer addressing a method therefor particularly useful in lithography. However, the procedures adopted therein are extremely complex. What is required is to simplify those means in a realistic way.

While the prior art reflects valid contributions facilitating the operation of tenon (503) cutting, a simplified and convenient solution to accomplishing that objective accurately, quickly and inexpensively yet remains to be addressed.

BRIEF SUMMARY OF THE INVENTION

An assembly is constructed to be clamped onto the top of a powered table saw as a tenon (503) forming tool. The assembly has its own guide fence (121) which responds to certain manipulations of the assembly by being moved either toward or away from the saw blade (552). This responsive movement can be understood by considering a right triangular shaped plate-like object (1) having a first side positioned against the guide fence (121), a second side projecting transversely from the guide fence (121) to as to dispose a right angle between them and a hypotenuse joining the two sides to complete the right triangle. One of the interior angles lies adjacent the guide fence (121). Upon manually advancing or withdrawing this plate-like object (1) along a line representing the cutting plane of the saw blade (552), the hypotenuse is caused to slide along in abutment against a fixed object (221). The gradient of the hypotenuse inherently forces the entire plate-like object (1) transversely toward or away from the saw blade (552) as the plate-like object (1) is either advanced or withdrawn.

The hypotenuse may be thought of as the combined resultant of two vectors, the advancement or withdrawal representing a first vector thereof and the lateral displacement as a second one.

Once an optimal position has been reached by the advancement or withdrawal manipulations, the plate-like triangle (1) may be set in place by an appropriate clamp (451). Then a workable piece (500) may be emplaced snugly against the guide fence (121) and advanced through the saw blade (552) to be cut. An understanding of trigonometry reveals that the distance of advancement or withdrawal represents the cosine related side (102) of the triangle and the displacement toward or away from the saw blade (552) represents the sine related side (101) thereof.

The assembly can be useful as a preliminary measuring device for cutting. It may be preset to cut at the vertical centerline (501) of a workable piece (500) if a protocol of sorts is followed. If one could assure that the cosine related side (102) of a conceived of triangle equaled the width of the workable piece (500)—the face thereof to be cut into—and that the sine related side (101) of the interior angle of the triangle equaled one-half the cosine related side (102) thereof, the vertical centerline (501) of the workable piece's (500) width would be determined.

Measuring curbs—a moveable one (11) and a fixed one (21)—are installed as parts of the assembly. The curbs (11, 21) are moved together in abutment and the guide fence (121) is positioned against the saw blade (552), an undertaking which be considered in colloquial parlance as "zeroing" the assembly. The curbs (11, 21) are separated to admit the width of the workable piece (500) as a matter of preliminary measurement and width of the workable piece (500) is snugly emplaced between them (11, 12) with the disposition so attained set by appropriate clamps (451). The workable piece (500) is then removed from between the curbs (11, 21) and emplaced snugly against the guide fence (121) to be advanced through the saw blade (552) for cutting. By reason of the one to one-half ratio between the cosine related side (102) of the triangle to the sine related side (101), the blade (552) will cut at the vertical centerline (501)—or, more correctly, will cut at a distance from the guide fence (121) equal to one-half the workable piece's (500) width.

If instead of cutting at the workable piece's centerline (501), it is desired to cut a cheek of a tenon (503), additional concerns must be addressed. A tenon (503) exactly the width of a given mortise may be formed merely be taking into account the mortise's width. Although the width of the mortise may first be measured for that purpose, for one cut by a drill-bit-chisel, supra, of width exactly equal that of the mortise it carves out, the chisel's width may instead be conveniently employed to that end. In that case, the width of the drill-bit-chisel is emplaced between the curbs (11,21) side-by-side the width of the workable piece (500) so that the length of the cosine related side (102) of the triangle considered equals the combined widths of the workable piece (500) and the drill-bit-chisel with the disposition so attained set by appropriate clamps (451). The workable piece (500) is then removed from between the curbs (11,21) and emplaced snugly against the guide fence (121) to be advanced through the saw blade (552) for cutting. Again, by reason of the one to one-half ratio between the cosine related side (102) of the triangle to the sine related side (101), the blade (552) will cut at a redetermined centerline (502)—that represented by the combined widths. This cut constitutes a tenon (503) cheek for the mortise it will be fitted to.

To cut the second cheek of the tenon (500), the workable piece (500) is rotated 180 degrees and advanced through the saw blade (552) for cutting. Upon removing the material outside the cuts—the tenon's (503) shoulders—a tenon (503) of precise width to fit the mortise is formed.

It is feasible to avoid removing the drill-bit-chisel from the drill press it was loaded in and subsequently reloading it therein. As a convenience, a spacer (61) equal in width to the given drill-bit-chisel may be interposed between the curbs (500) for side-by-side emplacement with the workable piece (500). The spacer (61) may comprise means of repositioning (63) to accommodate the widths of non-standard chisels or other mortise carving devices.

The precision by which the tenon (503) forming task is undertaken is made possible by reason of the one to one-half ratio of the cosine related side (102) of the triangle to the sine related side (101) thereof. To accomplish this result, it is necessary the angle determining those values be 26.565 degrees, for which the cosine thereof is 0.894 and the sine is 0.447. Furthermore, the assembly comprises angle determinant means (22) by which, as the moveable component (1) is advanced or withdrawn, this necessary angularity is maintained.

The assembly, then is comprised of a moveable component (1) capable of advancement and withdrawal parallel the saw blade's (552) cutting plane. The moveable component (1) must be supported upon a base plate—more specifically identified herein as a displacement accommodating component (3)—which connects to the saw table (550). Because the saw table (550) comprises a longitudinal translation channel (55V—sometimes referred to as a miter channel—it is convenient to fasten the base plate to the saw table (550) by a longitudinal translation rail (39) mated to the saw table's channel (551). This and other rail (271, 371, 39, 64, 127, 871,971) and channel (272, 372, 551, 65, 128, 872) interconnections are herein properly characterized as those of rigid attachment. Because saw tables (128) are manufactured by different companies to comprise non-standard or differing specifications, the distance of the longitudinal translation channel (551) from the saw blade (552) of one product may differ from another. Accordingly, a structure intermediate the moveable component W and the base plate is required permitting lateral translation which accommodates those non-standard differences. The three main parts are accordingly designated herein as the moveable component (1), the fixed component (2) and the displacement accommodating component (3).

BRIEF DESCRIPTION OF THE SEVERAL VIEWS OF THE DRAWINGS

Solid lines in the drawings represent the invention. Dashed lines represent either non-inventive material, that not incorporated into an inventive combination hereof and which may be the subject of another invention, or that which although so incorporated, lies beyond the focus of attention. A heavily framed outline of a portion of the drawing is representative of a number of specific variations of the more generic feature it symbolically identifies.

In FIG. 2, the subject matter hereof is represented merely as an enantiomer—that is, mirror image—of FIG. 1, indicating a version thereof for use by a left-handed operator, supra. In FIG. 6, a highly preferred embodiment of the invention is shown in which clamp adjustment translation slots (14, 24) are featured in the moveable and fixed components (1, 2, respectively).

FIGS. 7 and 8 comprise a overhead view an embodiment in which alternative positions of its guide fence (121) with reference to the saw blade (552) are similarly shown.

FIG. 9 is a perspective view of a workable piece (500) oriented in preferred disposition for tenon (503) cutting in which the vertical centerline (501) and the redetermined centerline (502) of the piece (500) are indicated.

FIG. 12 comprises a perspective view of an embodiment's moveable component (1).

FIG. 13 comprises a perspective view of an embodiment of the assembly's fixed component (2).

FIG. 14 comprises a perspective view of an embodiment's displacement accommodating component (3).

FIG. 15 comprises a perspective view of an embodiment's spacer assembly (6).

FIG. 24 is a view of an embodiment's moveable component (1) from underneath comprising an angular translation channel (128).

FIG. 25 is an overhead view of an embodiment's fixed component (2) comprising an angular translation rail (227).

FIGS. 26 and 27 are cross-sectional views of an embodiment's moveable component (1) illustrating an angled rail and channel assembly (222) comprising alternative angular translation rail (227) and channel (228) interface arrangements with the assembly's fixed component (2).

FIGS. 28 and 29 are cross-sectional views of an embodiment's moveable component (1) illustrating an angled projection fingers and channel assembly (223) comprising alternative angular projection fingers and channel (229, 228, respectively) interface arrangements with the assembly's fixed component (2).

DETAILED DESCRIPTION OF THE INVENTION

Figure 1:
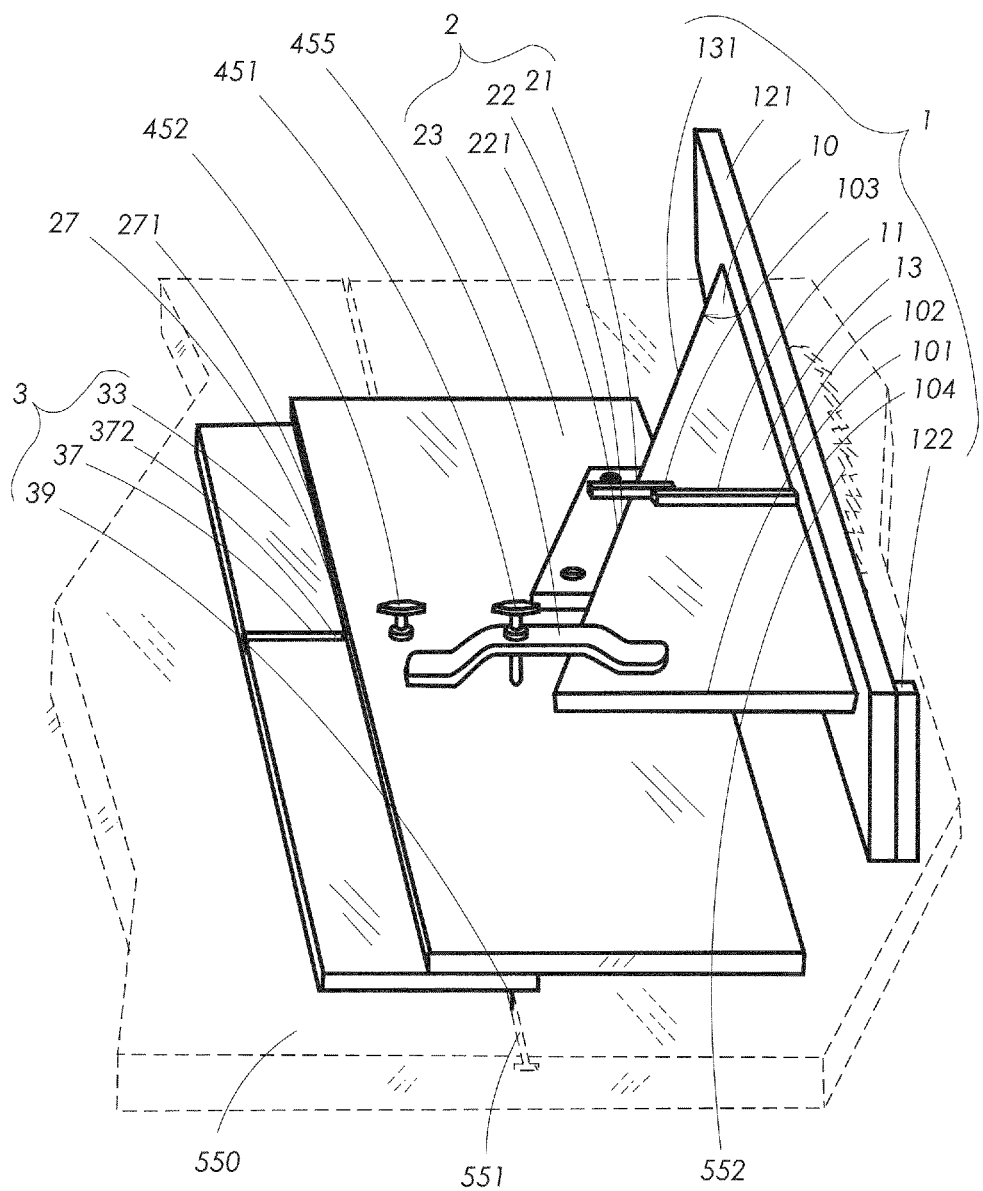
FIGS. 1-6 are perspective views of an embodiment of the assembly in which alternative positions of its guide fence (121) with reference to the saw blade (552) are illustrated, FIGS. 4 and 5 additionally illustrating an alternative fixed component (2) configuration from that of FIGS. 1 and 3.
Figure 2:
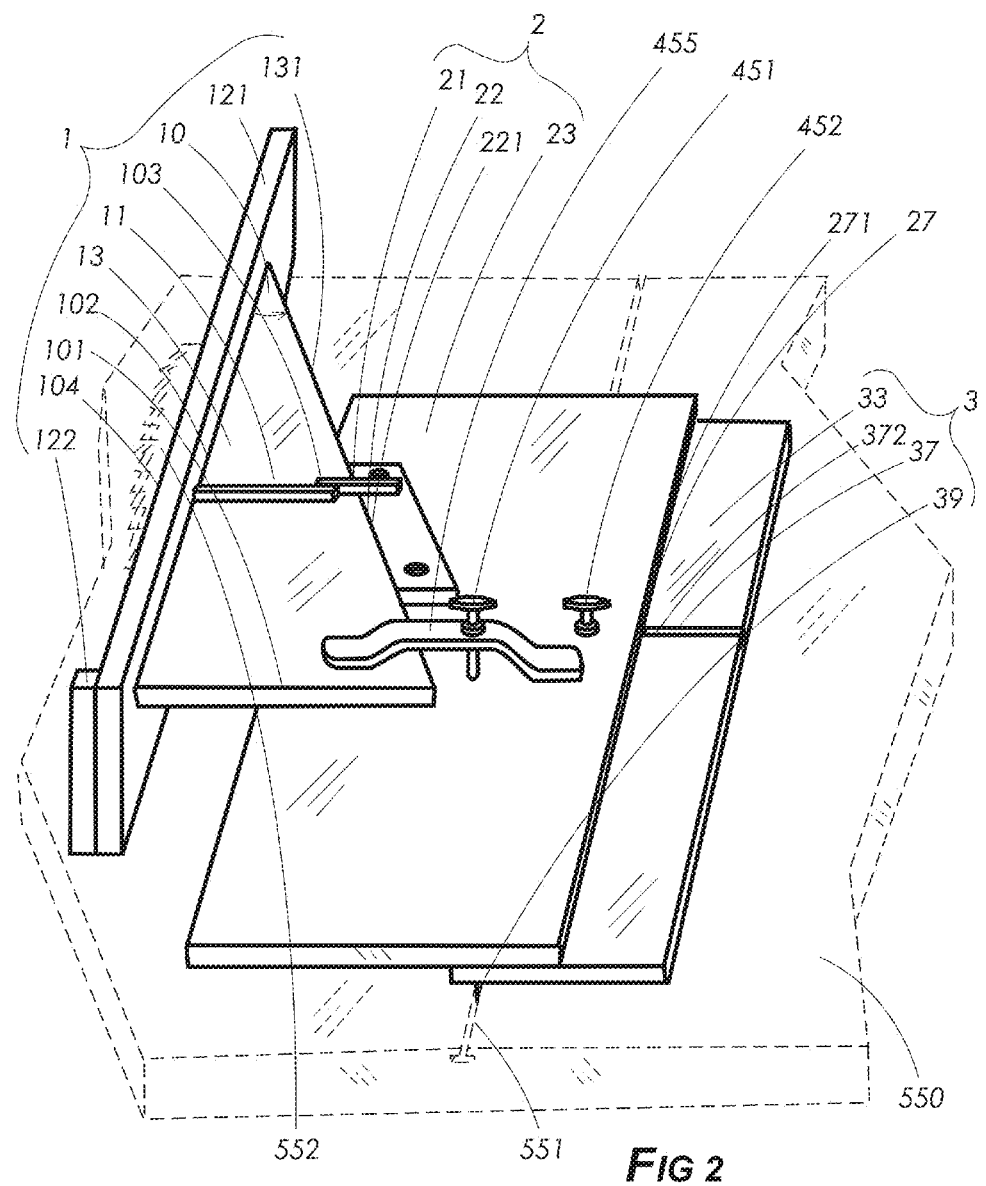

The subject matter hereof comprises a trigonometric saw-cut centering jig assembly disposed for use upon a saw table (550) of a powered table saw, the saw table (550) comprising a saw blade (552) disposed along a cutting plane, and a longitudinal translation channel (551). The jig assembly comprises in general a moveable component (1), a fixed component (2) and a displacement accommodating component (3).

Each component (1, 2, 3) of the preferred embodiment of the assembly comprises a plate-like body (13, 23, 33, respectively) comprising an upper surface and an underside and the position of each (1, 2, 3) with respect to that over which it (1, 2, 3) is disposed is set by clamp means (451, 452).

The moveable component (1) additionally comprises a moveable curb (11) attached to its plate-like body (23) and a guide fence (121) disposed parallel the saw blade's (552) cutting plane such that a workable piece (500) to be cut positioned snugly against the guide fence (121) and in alignment with the saw blade (552) may be advanced along the saw blade's (552) cutting plane and cut by operation thereof (552). Like its prior art forerunners, the guide fence (121) may additionally comprise a stabilizing abutment stop (122) disposed at its (121) proximal end to secure and steady the workable piece (500). The moveable curb (11) is attached to the moveable component plate-like body (13), preferably upon the upper surface thereof (13).

The moveable component (1), when released from its clamp means (451) to the fixed component (2), may be manually advanced and withdrawn in a direction parallel the cutting plane of the saw blade (552), the distance thereof defined herein as the longitudinal displacement adjusting factor (103).

The fixed component (2) additionally comprises a fixed curb (21) attached to its plate-like body (23) and disposed such that as the moveable component (1) is advanced parallel the saw blade's (552) cutting plane, a portion of the moveable curb (11) is brought into abutment with a portion of the fixed curb (21) in the manner of a stop. Preferably, the fixed component (2) further comprises lateral translation means (27) to laterally position the fixed component (2) upon the displacement accommodating component (3) and be set by clamp means of interconnection (452). The fixed curb (21) is attached to the fixed component plate-like body (23), preferably upon the upper surface thereof (23). Wherever the two curbs (11, 21) are respectively positioned, they (11, 21) must be disposed to contact one another (11, 21) in the intended manner.

Figure 6:
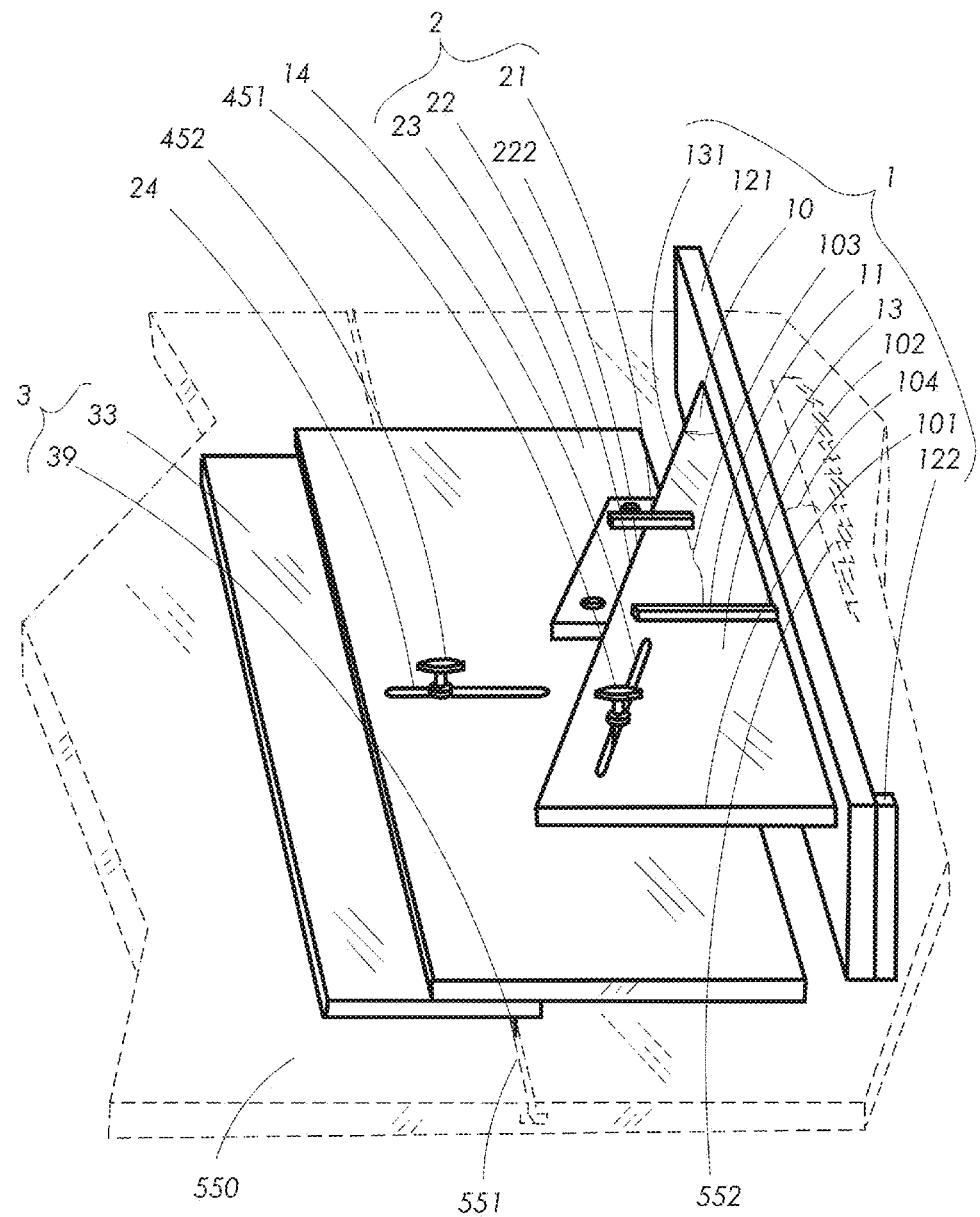
Figure 10:
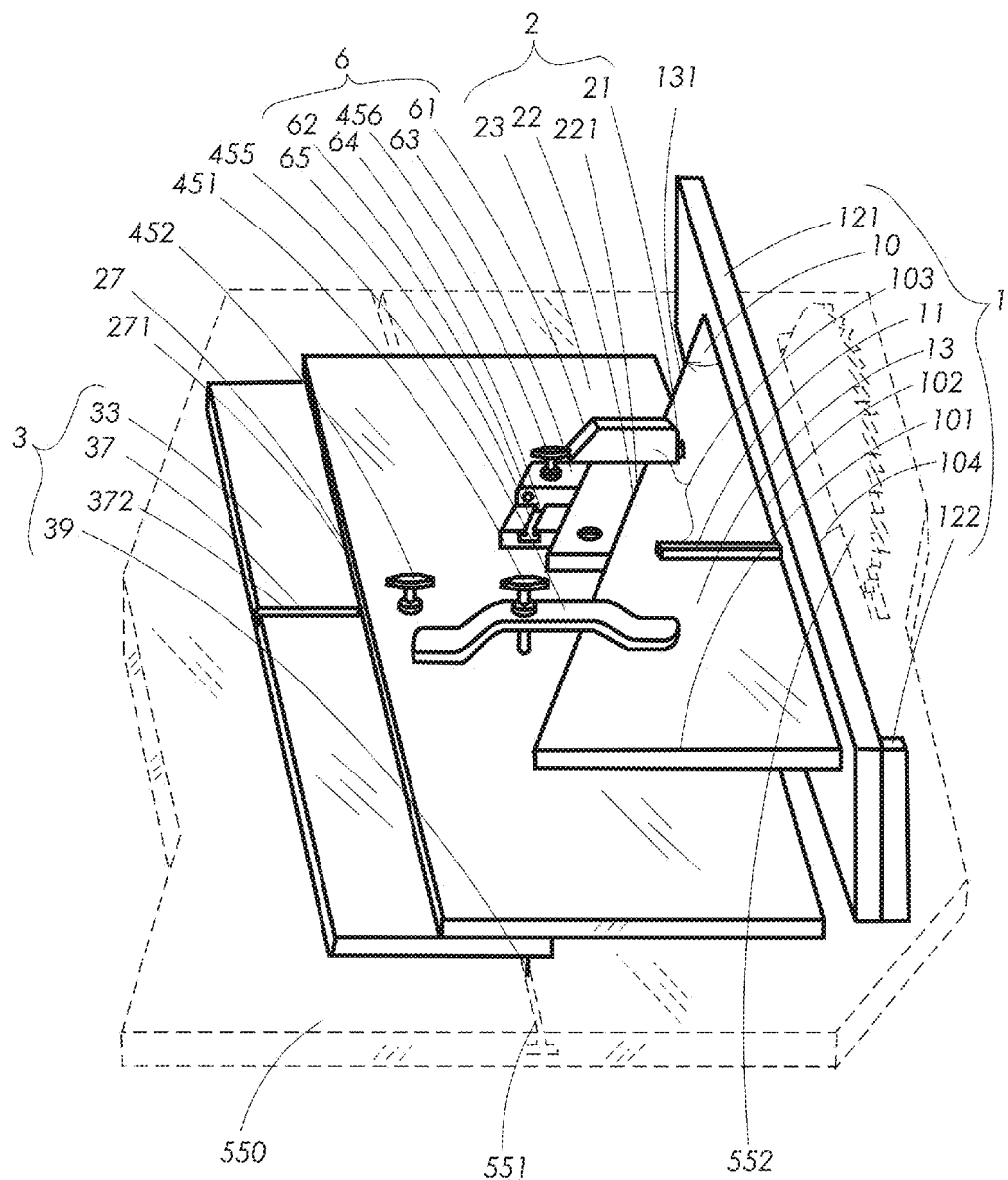
FIGS. 10 and 11 are perspective views of an embodiment including a spacer assembly (6) in which alternative positions of the vertically pivotable spacer (61) with reference to the fixed curb (21) are shown.
Figure 11:
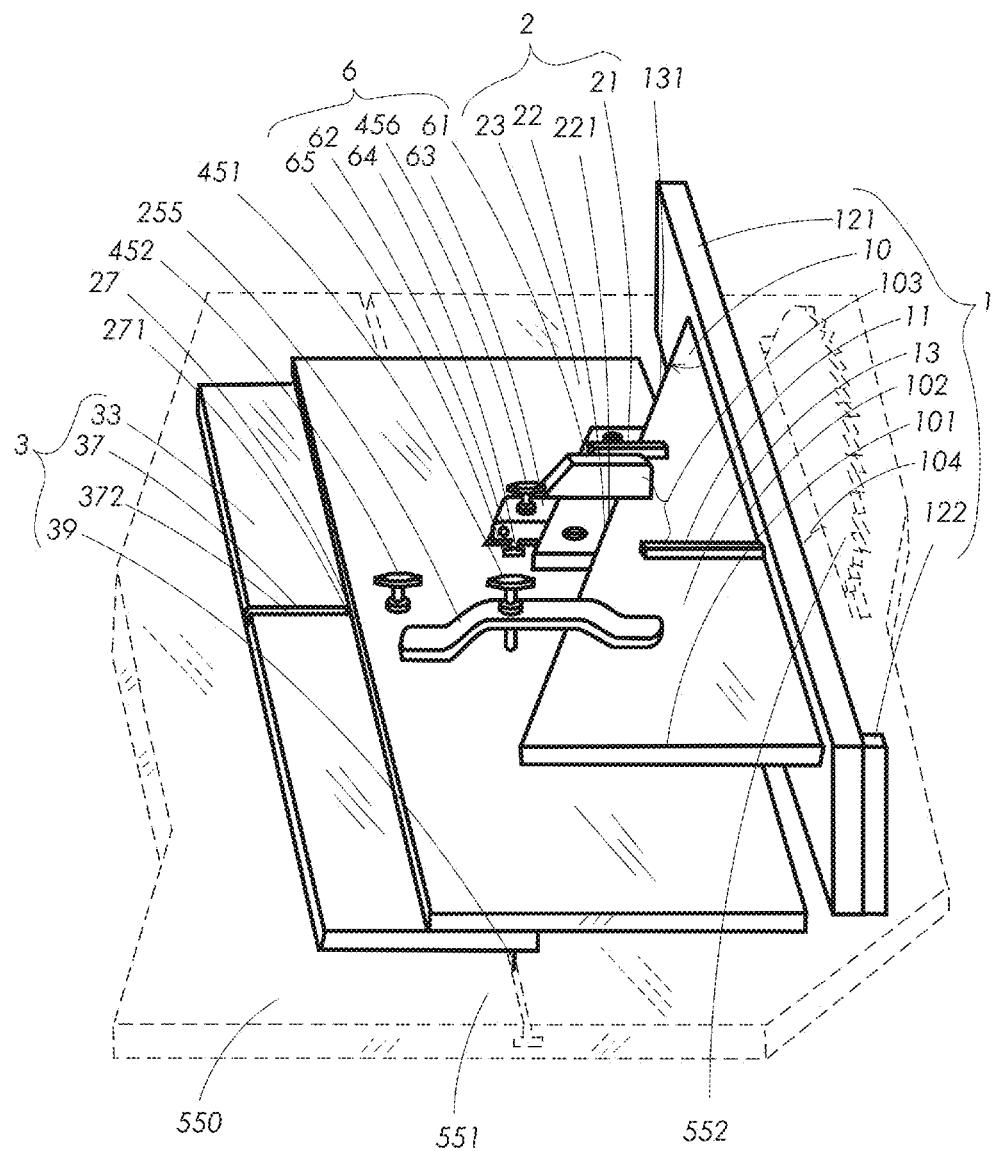

The presence of lateral translation means (27) comprised by the fixed component (2) facilitates lateral translation thereof (2) and more dependably assures proper alignment of the assembly's components. In a highly preferred embodiment of the invention, a fixed component's clamp adjustment translation slot (24) is disposed transverse the saw blade's (552) cutting plane and extends through the fixed component's plate-like body (23). The fixed component's clamp adjustment translation slot (24) provides lateral clearance for fixed component to displacement accommodating component clamp means (452) further discussed ante. By reason of its (24) configuration and disposition transverse the saw blade's (552) plane, as shown in FIG. 6, it, by itself (24), serves to maintain proper alignment during lateral translation, obviating the need for other lateral translation means—specifically, the fixed component's lateral translation means (27) otherwise preferably incorporated. Nonetheless, as an added reliability measure, both elements—the fixed component's clamp adjustment translation slot (24) and the fixed component's lateral translation means (27) may both be incorporated.

The displacement accommodating component (3) may additionally comprises lateral translation means (37) mated to the fixed component's lateral translation means (27) by reason of their (27, 37) interconnection, where such means (27) are present. The fixed component's lateral translation means (27), where present, may comprise a rail (271) and the displacement component's lateral translation means (37), a channel (372) to which the rail (271) is mated or, alternatively, the moveable component's lateral translation means (27) may comprise a channel (272) and the displacement component's lateral translation means (37), a rail (371) mated to the channel (272). Any translation means (12, 27, 37, 97) which allows free movement between members is acceptable. Rails (39, 64, 99, 127, 227, 271, 371, 871, 971) and channels (65, 128, 228, 272, 372, 551, 872,972) are desirable because of the ease with which one member can be made to slide along against the other.

The displacement accommodating component (3) further comprises a longitudinal translation rail (39) mated to and interconnected with the saw table's longitudinal translation channel (551) such that the displacement accommodating component (3) may be repositioned upon the saw table (550) and maintained parallel the cutting plane of the saw blade (552.).

The main reason for providing either lateral translation means (27, 37) between the fixed component (2) and the displacement accommodating component (3) or a fixed component's clamp adjustment translation slot (24), or perhaps both (24, 27, 37), is because not all saw tables (550) are manufactured with identical measurements for their (550) parts. It is not unusual for the distance between the saw blade (552) and the saw table's longitudinal translation channel (551) to vary from one manufactured assembly to another. It should be recognized that once the displacement accommodating component (3) has been connected to the saw table (550) by interconnection of its longitudinal translation rail (39) with the saw table's longitudinal translation channel (551), only limited capability of laterally repositioning the entire inventive assembly—the subject matter hereof—would otherwise remain. It is true the moveable component (1) may be advanced or withdrawn parallel the cutting plane of the saw blade (552), permitting lateral repositioning equal to corresponding changes thereby effected in the lateral displacement adjusting factor (104). It is also true the entire inventive assembly can be advanced and withdrawn by readjusting the displacement accommodating component's longitudinal translation rail (39) within the saw table's longitudinal translation channel (551). However, the configuration and disposition of the moveable component (1) inherently limits the amount of lateral displacement possible. Moreover, provision for the more direct lateral translation between the fixed and the displacement accommodating components (2, 3, respectively) makes use of the entire inventive assembly more convenient.

The inventive assembly which is the subject matter hereof further comprises angle determinant means (22) disposed at an acute angle measured clockwise from the saw blade's (552) cutting plane, the angle herein defined as the jig determined angle (10). Upon advancing or withdrawing the moveable component (1) in a direction parallel the cutting plane of the saw blade (552), the advancement or withdrawal conforms only to the path provided by the angle determinant means (22) such that the guide fence (121) is moved, respectively, toward or displaced from the saw blade (552) effecting a separation distance therefrom (552), transverse the saw blade's (552) cutting plane. The separation distance is herein defined as the lateral displacement adjusting factor (104).

Any one of several forms may comprise the angle determinant means (22) addressed herein. The angle determinant means (22) may, thus, be configured and disposed such that the fixed component (3) comprises an angled abutment ridge (221) and the moveable component comprises a running abutment edge (131). It (22) may alternatively be configured and disposed such that the moveable component (1) and the fixed component (2) comprise mated members of an angled rail and channel assembly (222). It (22) may similarly otherwise be configured and disposed such that those components (1, 2) comprise mated members of an angled projection fingers and channel assembly (223).

The movements of the components (1, 2) manifest angular vectors wherein the distance of the moveable component's (1) advancement or withdrawal parallel the saw blade's (552) cutting plane manifests a longitudinally disposed vector comprising a first side of a triangle. The transverse separation distance between the moveable component's fence (121) and the saw blade (552) manifests a laterally disposed vector comprises a second side of the triangle. The interior angle between the first and second sides comprises a right angle. A projection of the angle determinant means (22) intersecting the first and second sides comprises a third side of a manifested right triangle and represents the hypotenuse thereof. The first side thereof represents a cosine related side (102) and the second side thereof represents a sine related side (101). The vertex of the jig determined angle (10) comprises the most longitudinally distal portion of the right triangle. It should be observed, then, that, unless otherwise specified herein, the moveable component (1) is not necessarily restricted to any particular shape so long as the trigonometric functions can be manifested in this abstract manner.

Figure 3:
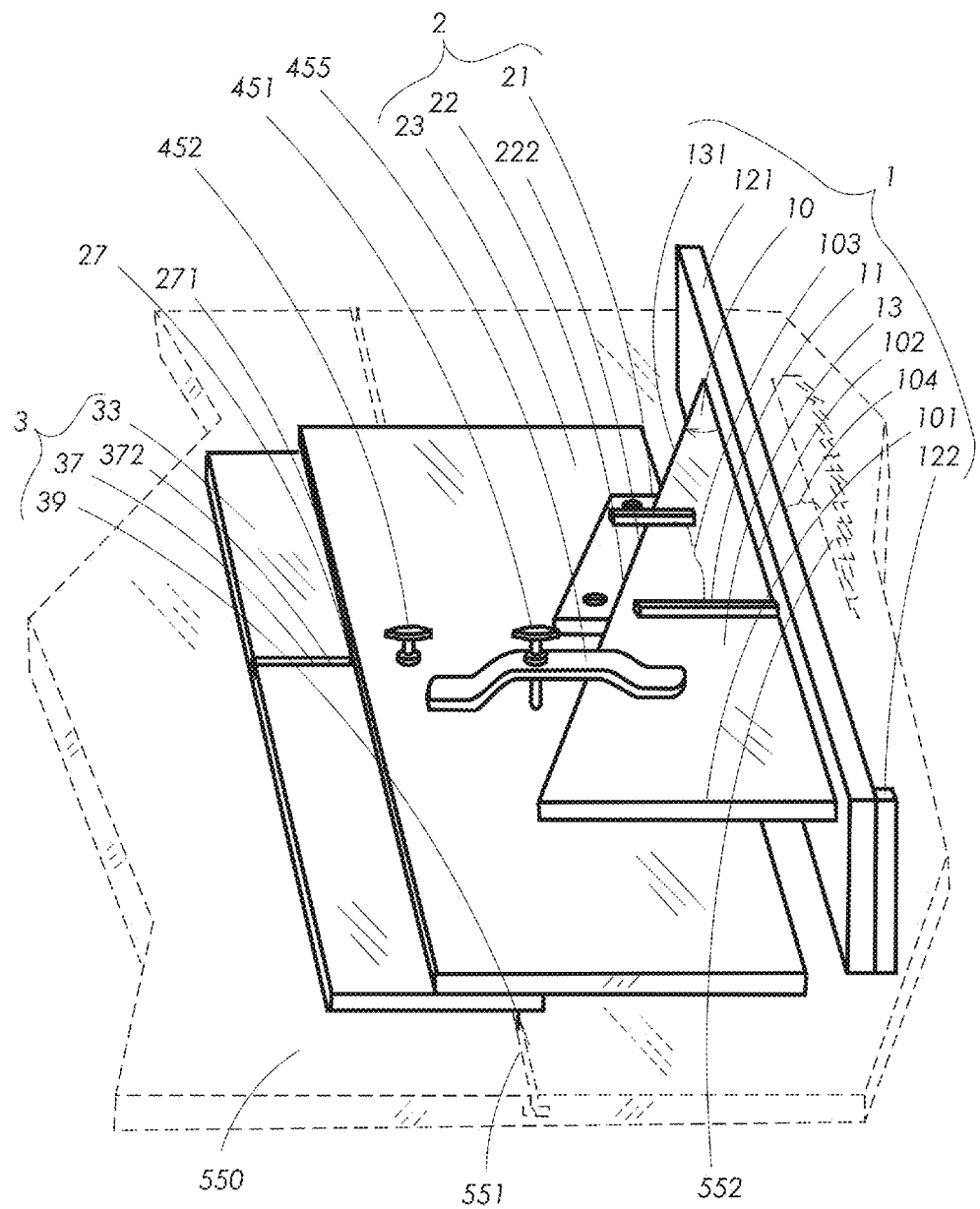
Figure 4:
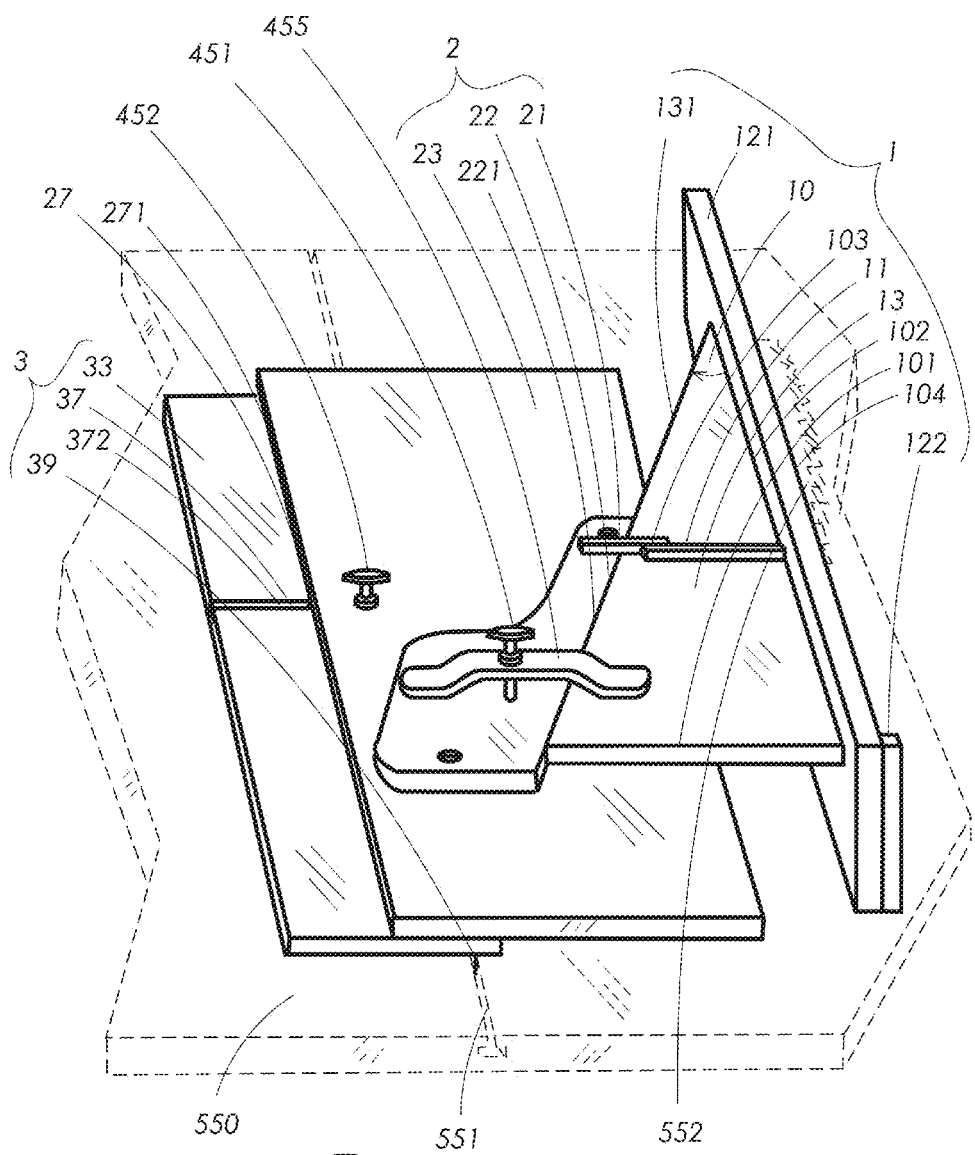
Figure 5:
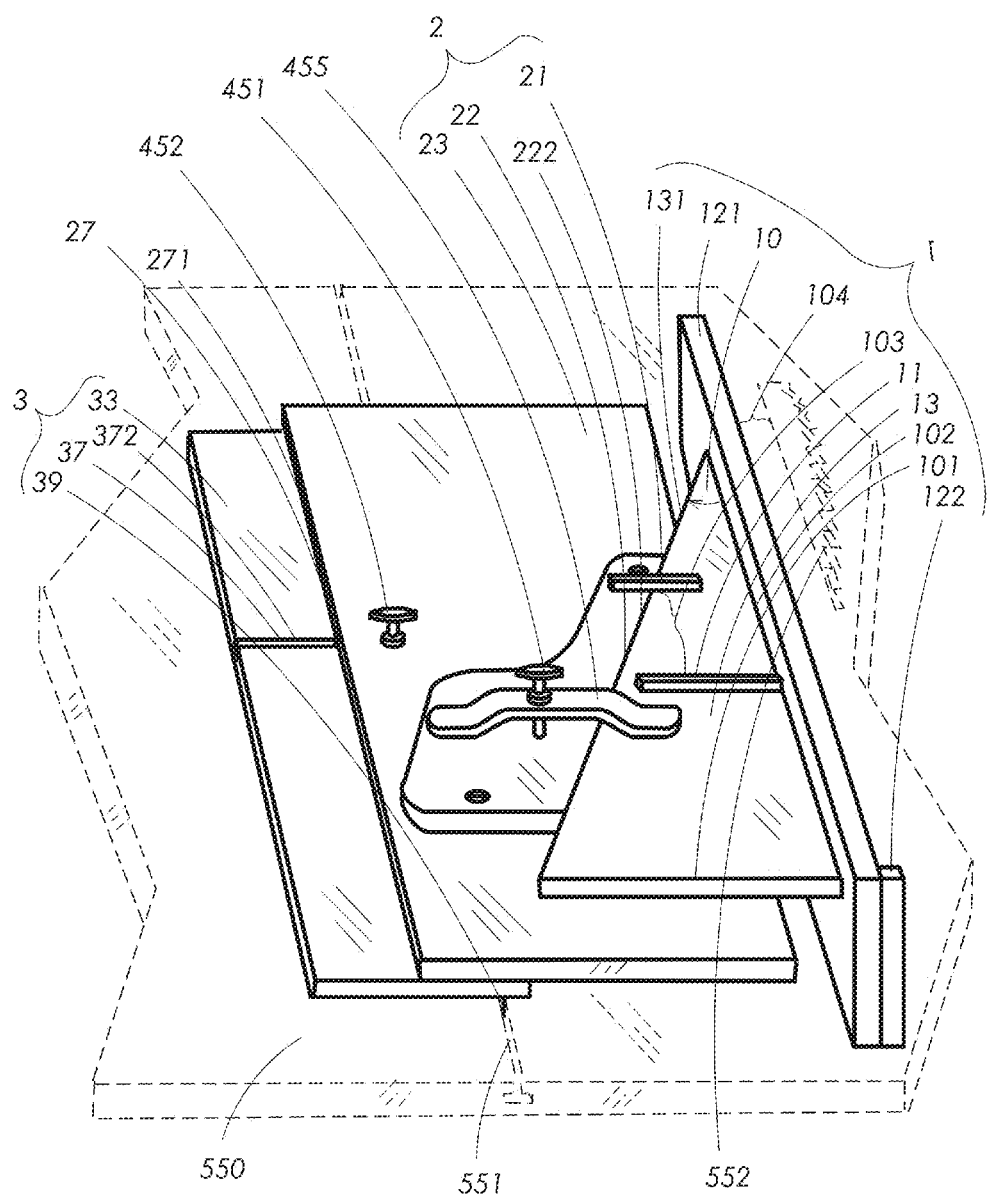

Advancing the moveable curb (11) such that it is brought together in abutment with the fixed curb (21) manifests a longitudinal displacement adjusting factor (103) of zero. The fixed component (2) may then be laterally repositioned with reference to the displacement accommodating component (3) such that the guide fence (121) is caused to abut the saw blade (552), manifesting a lateral displacement adjusting factor (104) of zero. A workable piece (500) may then be positioned with its (500) width disposed snugly between the curbs (11, 22), manifesting a longitudinal displacement adjusting factor (103) equal to the distance between the curbs (11, 12). By reason of the jig determined angle (10) and the sine and cosine values of the manifested right triangle, the lateral displacement adjusting factor (104) comprises the product of the longitudinal displacement adjusting factor (103) and a fraction equal to the ratio of the sine value for the jig determined angle (10) to the cosine value therefor. This positions the workable piece (500) adjacent the saw blade's (552) cutting plane such that a corresponding fraction of its (500) width is disposed between the guide fence (121) and the saw blade (552), resulting in the assembly's disposition shown in FIG. 1. In colloquial parlance, the preparatory manipulations addressed may be regarded as "zeroing the assembly". Withdrawing the moveable component (1) in a direction parallel the saw blade's (552) cutting plane disposes it (1) as shown in FIG. 3. These same observations may be made by examining FIGS. 4 and 5 as well as FIGS. 7 and 8.

These zero setting steps may be undertaken in more or less reverse order wherein, beginning with the assembly's disposition in FIG. 3, the moveable component (1) is advanced parallel the saw blade's (552) cutting plane such that the moveable component's guide fence (121) is caused to abut the saw blade (552), thereby achieving a lateral displacement adjusting factor (104) of zero, the assembly's disposition shown in FIG. 1. In this disposition, the moveable curb (11) may be caused by other adjustments to abut the fixed curb (21), thereby also achieving a longitudinal displacement adjusting factor (103) of zero.

If the jig determined angle (10) is made to equal 26.565 degrees, the sine thereof equals 0.447 and the cosine, 0.894. For that right triangle, then, by reason of the ratio of the sine value to the cosine value, the sine related side (101) of the manifested right triangle will equal in length one-half that of the cosine related side (102) thereof. Positioning a workable piece (500) with its (500) width disposed snugly between the curbs (11, 21) effects a longitudinal displacement factor (103) equal to the distance between the curbs (11, 21) and thereby laterally displaces the guide fence (121) from the saw blade (552) a distance comprising by reason of the 26.565 degree angle and the 0.447 sine and 0.894 cosine values of the manifested right triangle, a lateral displacement adjusting factor (504) equal to one-half the width of the workable piece (500), thereby positioning the workable piece's vertical centerline (501) adjacent the saw blade's (552) cutting plane.

It should be observed that in following this protocol, the saw blade (552) does not actually cut directly at the workable piece's vertical centerline (501) but rather, just enough beyond it to allow the span of one-half the workable piece's (500) width to remain. Thus, it is unnecessary to provide for any additional clearance to off-set the width of the saw blade (552).

When the assembly is used to cut a tenon (503)—its most common application—the width of the tenon (503) is made to equal that of the mortise it (503) is formed to fit and, as mentioned supra, a drill-bit-chisel loaded upon a drill press is often employed to that end.

It is often inconvenient to remove the drill-bit-chisel from the drill press in which it has been loaded and emplace it between the curbs (21, 31). Accordingly, a spacer assembly (6) attached to the fixed component's plate-like body (23) is provided comprising a vertically pivotable spacer (61) pivotable upon a spacer assembly pivot axle (62) and configured with width selected to equal that of a given mortise chisel, often that equal to what some have perceived to be the most common chisel or mortise width—say, one inch or three-quarters of an inch. The spacer assembly (6) is attached to the upper surface of the fixed component (2) and disposed such that its vertically pivotable spacer (61) is caused to pivot downward, disposing it (61) upon the fixed component's (2) upper surface proximate the fixed curb which (21), for such purpose, must also be accordingly disposed upon that surface. Once the vertically pivotable spacer (61) is disposed to abut the fixed curb (21), the width of the workable piece (500) is emplaced snugly adjacent the spacer (61) and the moveable curb (11) is advanced to abut the workable piece (500). A longitudinal displacement adjusting factor (103) equal to the combined widths of the spacer (61) and workable piece (500) is thereby provided which correspondingly manifests a lateral displacement adjusting factor (103) equal to exactly half that.

In cutting the tenon (503), then, the saw blade (552) is caused to cut a first cheek thereof (503) and, upon afterward rotating the workable piece (500) 180 degrees, to cut a second cheek thereof (503). The two cuts, by reason of the readjusted longitudinal displacement adjusting factor (103) for the combined workable piece (500) and spacer (61) width, form a tenon (503) of precise spacer (61) width.

Optionally, the spacer assembly (6) may additionally comprise an adjustment block (63) in turn comprising a translation rail (64) and a translation channel (65). The rail (64) and channel (65) combination are disposed to allow the vertically pivotable spacer (61) to be translated from the fixed curb (21), thereby allowing readjustment for a chisel—hence mortise—of different width. The assembly comprises spacer adjustment clamp means (456) to set the spacer assembly's rail (64) and channel (65) translation.

What has been thus far described for the moveable component's plate-like body (13) permits considerable variance in its configuration. In a preferred embodiment, however, the moveable component's plate-like body (13) is itself (13) configured as a right triangle embodying the characteristics of the manifested right triangle considered supra. Thus, the plate-like body (13) comprises a first interior angle distally disposed along a parallel to the saw blade's (552) cutting plane, a second interior angle comprising the right angle proximally disposed along a side parallel the saw blade (552) and a third interior angle laterally disposed to the right angle. As was observed in the manifested triangle, supra, the side adjacent the distal interior angle and running to the right angle comprises the triangle's cosine related side (102). The side opposite the right angle comprises the triangle's hypotenuse and the side opposite the distal angle comprises the triangle's sine related side (101). Again, if the right triangle's distal interior angle, the jig determined angle (10), equals 26.565 degrees, the side opposite the distal interior angle is equal in length to one-half that of the side adjacent the distal interior angle by reason the 0.447 sine and 0.894 cosine values of that angle.

Once the components (1, 2, 3) have been positioned for the assembly's use, they (1, 2, 3) must be dependably fixed in place. Clamp means (451, 452) mentioned supra are, therefore, provided for to this end. Whatever depiction of a given clamp might be shown as in the drawings, it is intended any clamp known to prior art may be employed. In that respect, the use of the term "clamp" is intended herein to comprise a more or less generic sense as clearly shown in FIGS. 16 and 17. The reason for this assertion in that it is not the clamps which comprise the inventive assembly with innovation, the clamps being merely common connective elements, much in the way nails or screws are used to fasten other inventive assembly parts together. The same is true of the various configurations for rail (39, 64, 99, 127, 227, 271, 371, 871, 971) and channel (65, 128, 228, 272, 372, 551, 872, 972) assemblies. Any prior art form for those paired components may be employed in the inventive assembly, so long as translation is attained between them. That understood, then, the assembly comprises the moveable component to fixed component clamp means (451) and the fixed component to displacement accommodating component clamp means (452). Any one of a number of commercially available clamp configurations may be employed.

Certain embodiments of the inventive assembly may comprise pass-through openings (256) to accommodate the inclusion of the clamp means (451, 452), depending upon the clamp means (451, 452), selected. In other embodiments, certain of the clamp means (451 and 452),—the moving component to fixed component clamp means (451), for instance—may merely be attached to the fixed component's plate-like body (23). In some embodiments, the fixed component (2) comprises pass-through openings (256) for both clamp means (451, 452). It (2) comprises a first such opening (256) to allow upwardly extending passage through it (2) of the moveable component to fixed component clamp means (451) and a second such opening (256) to allow upwardly extending passage through it (2) of the fixed component to displacement accommodating component clamp means (452). In a highly preferred embodiment, the moveable component (1) comprises a clamp adjustment translation slot (14) which extends through its plate-like body (13) disposed in a direction equal to the jig determined angle (10) such that the moveable component to fixed component clamp means (451) may be freely moved during advancement and withdrawal of the moveable component (1) in a direction parallel the saw blade's (522) cutting plane. The moveable component's clamp adjustment translation slot (14) obviates the presence of one of the fixed component's clamp means openings (256). As noted, supra, a fixed component's clamp adjustment translation slot (14) obviates the presence of the other (256).

Figure 16:
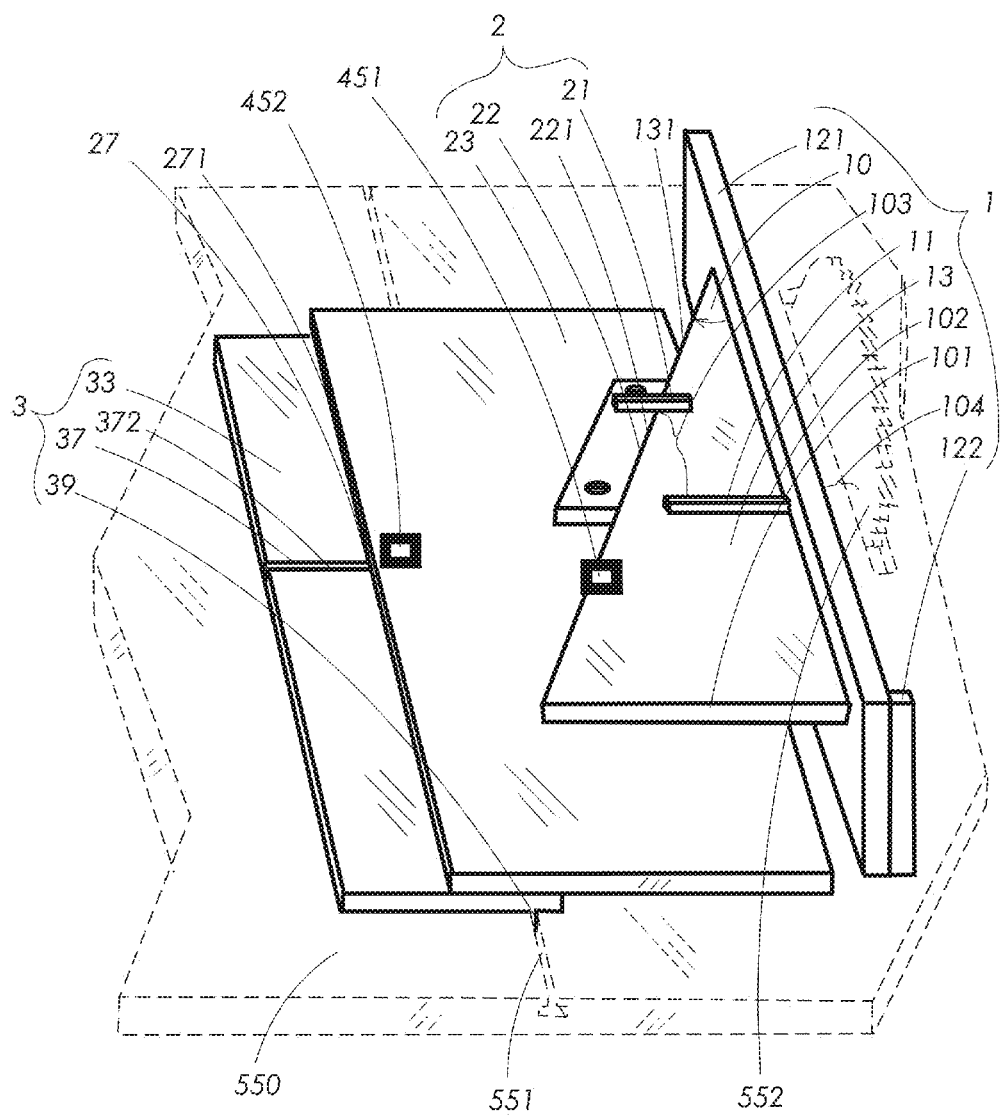
FIGS. 16 and 17 are perspective views of an embodiment of the assembly illustrating generic representations of respective clamp means (451 and 452), the latter depiction also including spacer assembly clamp means (456).
Figure 17:
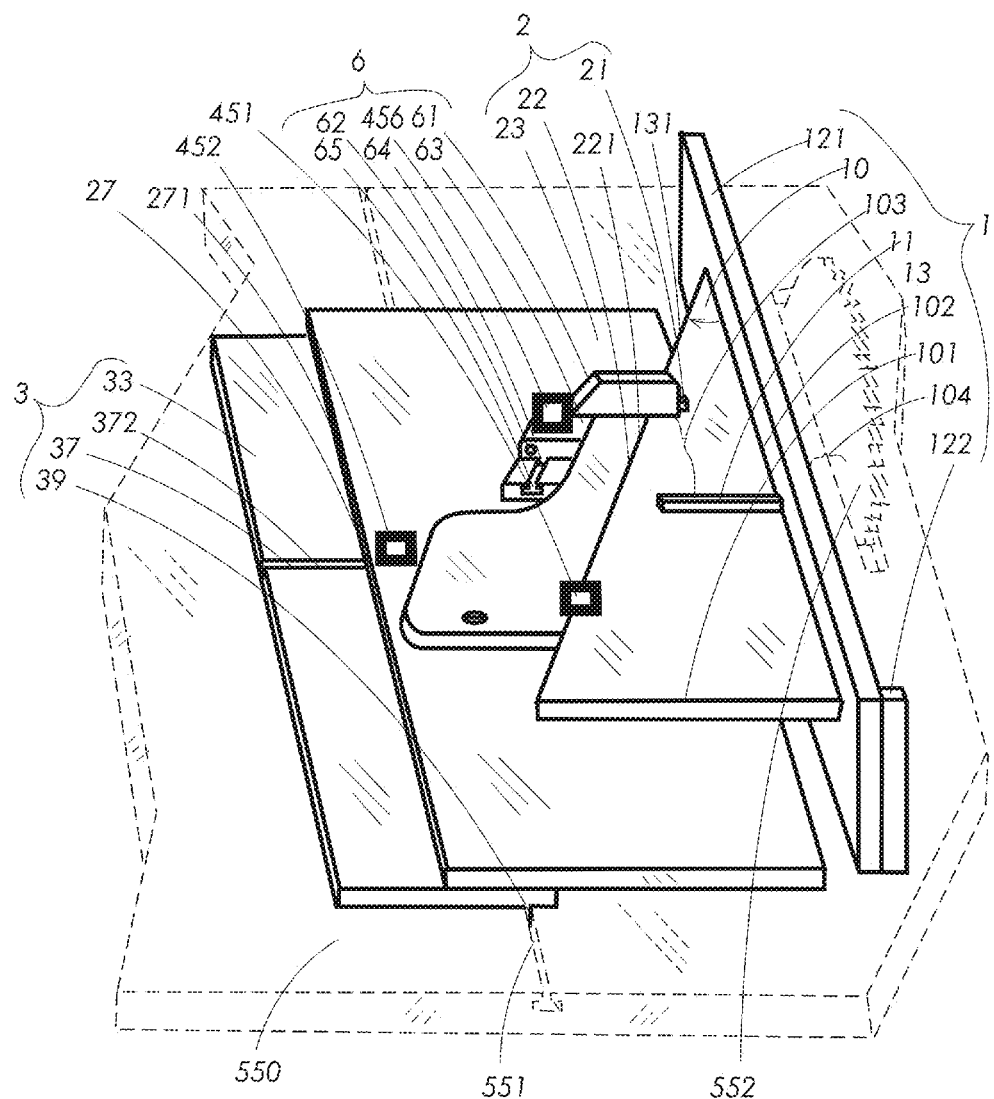
Figure 18:
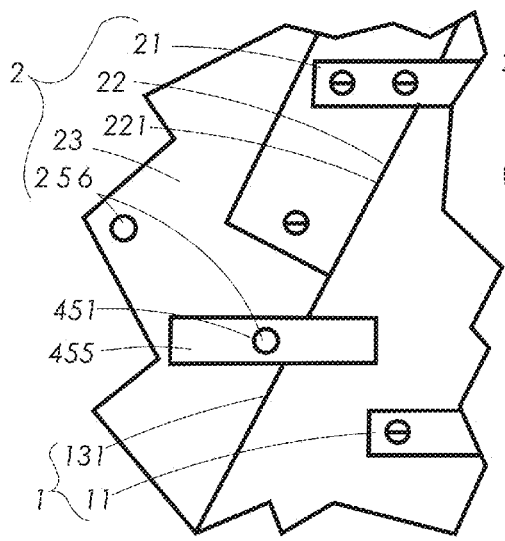
FIGS. 18-21 are cut-away overhead views of a portion of the assembly illustrating alternative dispositions of a straddling clamp means brace (454, 455) to set the moveable component (1) to the fixed component (2) to provide desired operative adjustment clearance.
Figure 19:
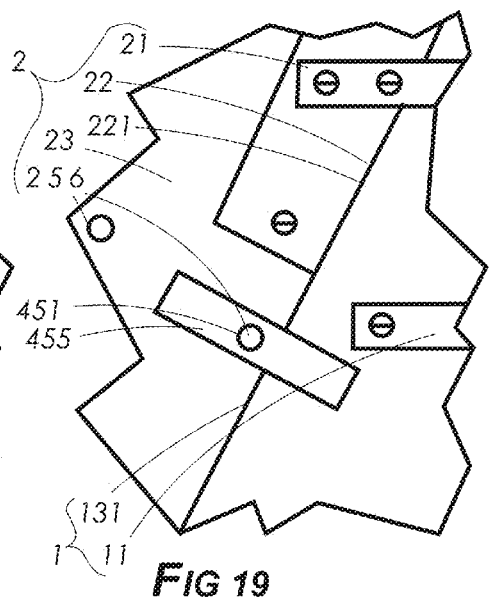
Figure 20:
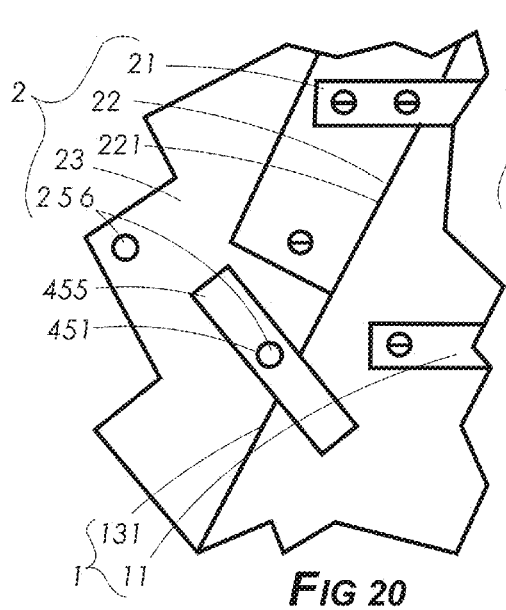
Figure 21:
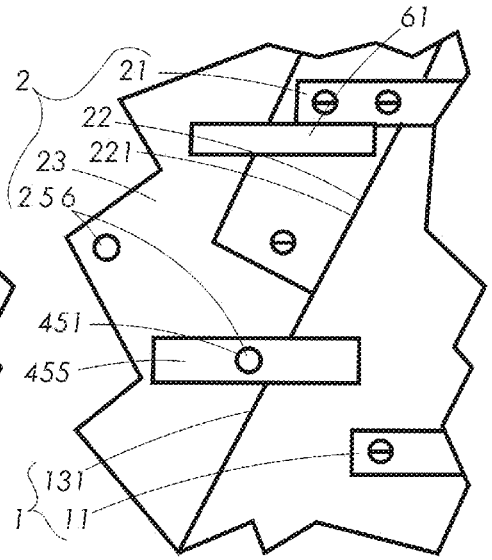

In certain embodiments and depending upon the particular structure, the moveable component to fixed component clamp means (451) may comprise either a mono-level or a bi-level straddling clamp brace (454, 455, respectively) to set the adjustment of the moveable component (1) upon the fixed component (2). Thus, in an assembly in which the anchoring point of the moveable component to fixed component clamp means (451) is disposed upon the fixed component's plate-like body (23) at the same level as that of the moveable component's plate-like body (13)—as in FIGS. 4, 5, 13 and 17—a mono-level straddling clamp means brace (454) is provided. In an assembly in which the anchoring point of the moveable component to fixed component clamp means (451) is disposed upon the fixed component's plate-like body (23) at a level lower than the moveable component's plate-like body (13)—as in the embodiments shown in FIGS. 1, 2, 3, 7, 8, 10,11 and 16—a bi-level straddling clamp means brace (455) is provided. As one intends to withdraw the moveable component (1) parallel the cutting plane of the saw blade (552), the moveable curb (11) may occasionally become partially blocked by obstruction of the straddling clamp brace (454, 455) for the moveable component to fixed component clamp means (451). While FIGS. 16 and 17 illustrate generic representations for the various clamp means (451, 452 and 456), a moveable component to fixed component clamp means (451) such as that shown in FIG. 1 and several other drawings in which the straddling clamp brace (454, 455) may be turned at an angle to provide clearance to the moveable curb (11) is preferred. Thus, in FIGS. 19 and 20, the straddling clamp brace (455) is shown turned from its disposition in FIG. 18 to accomplish that end. FIG. 20, in which a vertically pivotable spacer (61) is provided, merely shows the same straddling clamp brace (455) disposition as in FIG. 17

Figure 22:
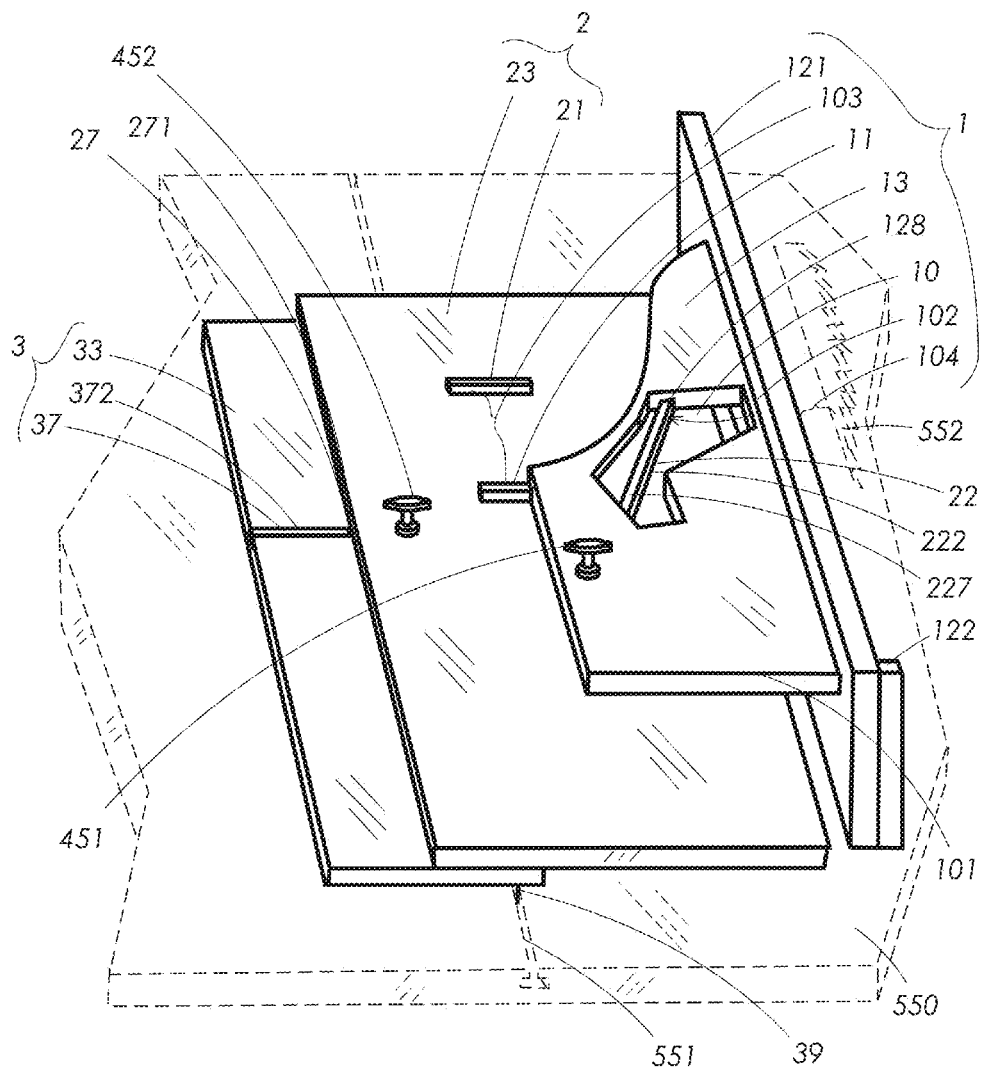
FIG. 22 is a perspective cut-away view of an embodiment of the assembly comprising an angled rail and channel assembly (222) as angular determinant means (22).

The angled abutment ridge (221), in graphically outlining in part a right triangular figure and ostensibly presenting a surface against which the moveable component (1) is laterally restrained in advancement and withdrawal, illustrates with a fair degree of clarity the concept of the angle determinant means (22). However, the other constructions the means (22) allows for are equally effective. For the angle determinant means (22) comprising an angled rail and channel assembly (222), the moveable component (1) may comprise an angular translation channel (128) disposed within the underside of its plate-like body (13) as depicted in FIG. 22, at an acute angle measured clockwise with reference to the saw blade's cutting plane. In this arrangement, the fixed component (2) comprises disposed upon the upper surface of its plate-like body (23) an angular translation rail (227) mated to the angular translation channel (128). As the moveable component (1) is advanced and withdrawn parallel the saw blade's cutting plane, it (1) is laterally constrained in the same manner observed with the angled abutment ridge (221) and angled running abutment edge (131) arrangement. As illustrated in FIGS. 26 and 27, the angled rail and channel assembly (222) may have its elements reversed such that the fixed component (2) comprises an angular translation channel (228) and the moveable component (1) an angular translation rail (127) upon its (1) underside.

Figure 23:
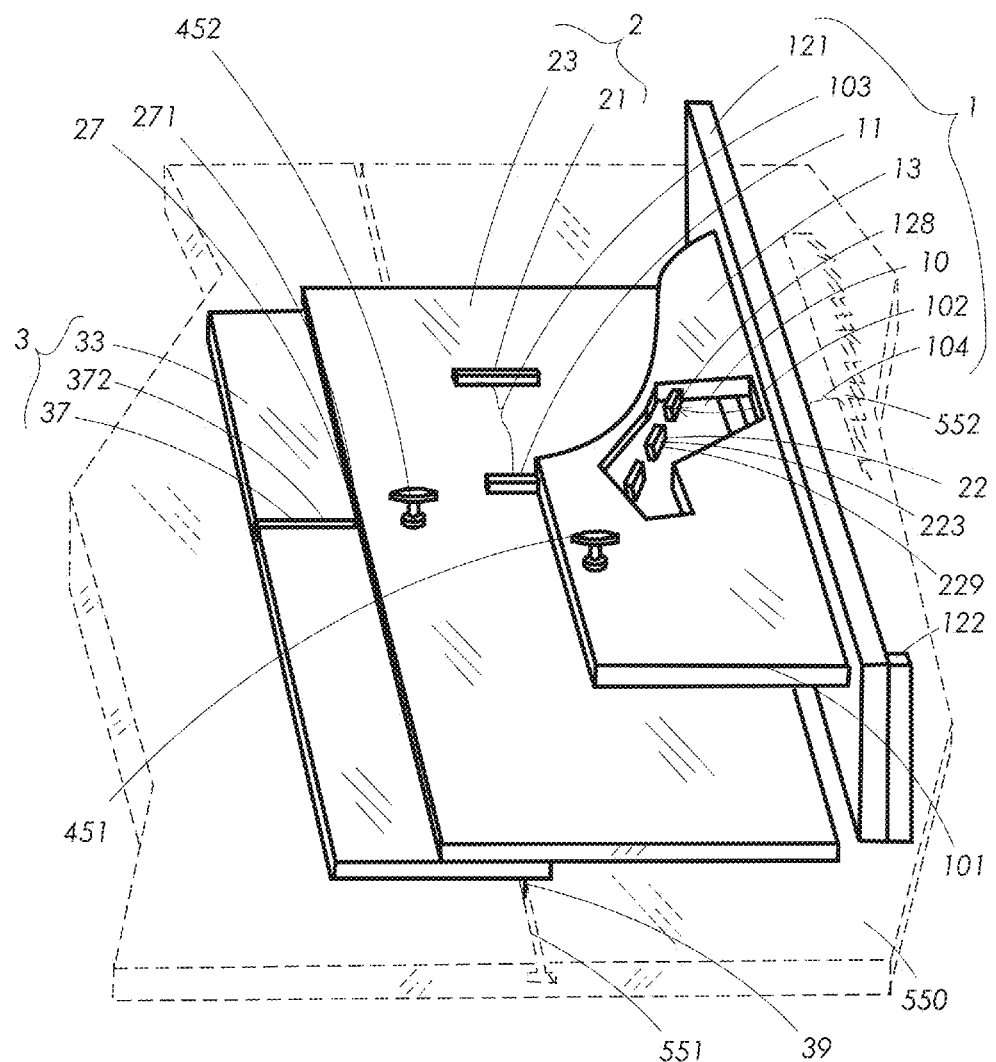
FIG. 23 is a perspective cut-away view of an embodiment of the assembly comprising an angled projection fingers and channel assembly (223) as angular determinant means (22).

Similarly, for angle determinant means (22) comprising an angled projection fingers and channel assembly (223), the moveable component (1) may, again as depicted in FIG. 22, comprise an angular translation channel (128) disposed within the underside of its plate-like body (13) at an acute angle measured clockwise with reference to the saw blade's cutting plane. In this arrangement, the fixed component (2) comprises disposed upon the upper surface of its plate-like body (23) angular translation projection fingers (229) mated to the angular translation channel (128) as depicted in FIG. 23. As the moveable component (1) is advanced and withdrawn parallel the saw blade's (552) cutting plane, it (1) too, is laterally constrained in the same manner observed with the angled abutment ridge (221) angled running abutment edge (131) arrangement. As illustrated in FIGS. 28 and 29, the angled projection fingers and channel assembly (223) may have its elements reversed such that the fixed component comprises an angular translation channel (228) and the moveable component (1) angular translation projection fingers (129) upon its (1) underside. An illustrative configuration of a series of projection fingers (129, 229) is shown in FIG. 23.

In an arrangement in which the moveable component would otherwise comprise an angular translation channel (128) as part of the angular determinant means (22), the inclusion of a moveable component's clamp adjustment slot (14) for use in conjunction with moveable component to fixed component clamp means (451) may be employed to the same end. Thus, the clamp adjustment slot (14) may supplant the angular translation channel (128). By reason of the adjustment slot's (14) configuration and disposition in alignment with the jig determined angle (10), as shown in FIG. 6, it, by itself, (14) serves to maintain proper angular alignment during advancement or withdrawal of the moveable component in a direction parallel the saw blade's (552) cutting plane. Even where the angular rail and channel assembly (222) has its elements reversed such that the moveable component comprises the angular translation rail (127) as its part of the assembly (222) and the fixed component comprises the angular translation channel (228) as its part thereof (222), the moveable component's clamp adjustment slot (14) and moveable component to fixed component clamp means (451) may be employed in alignment and conjunction with the angular rail and channel assembly (222) and lock or anchor into it (222) to set the desired adjustment position. This partial merger of functions parallels that addressed supra for the fixed component's clamp adjustment translation slot (14) in its conjunction with its lateral translation means (27). Yet, if desired, as an added reliability measure, both elements—the moveable component's clamp adjustment translation slot (14) and the moveable component's angular translation means (27) may both be separately incorporated—side-by-side, for instance.

Figure 30:
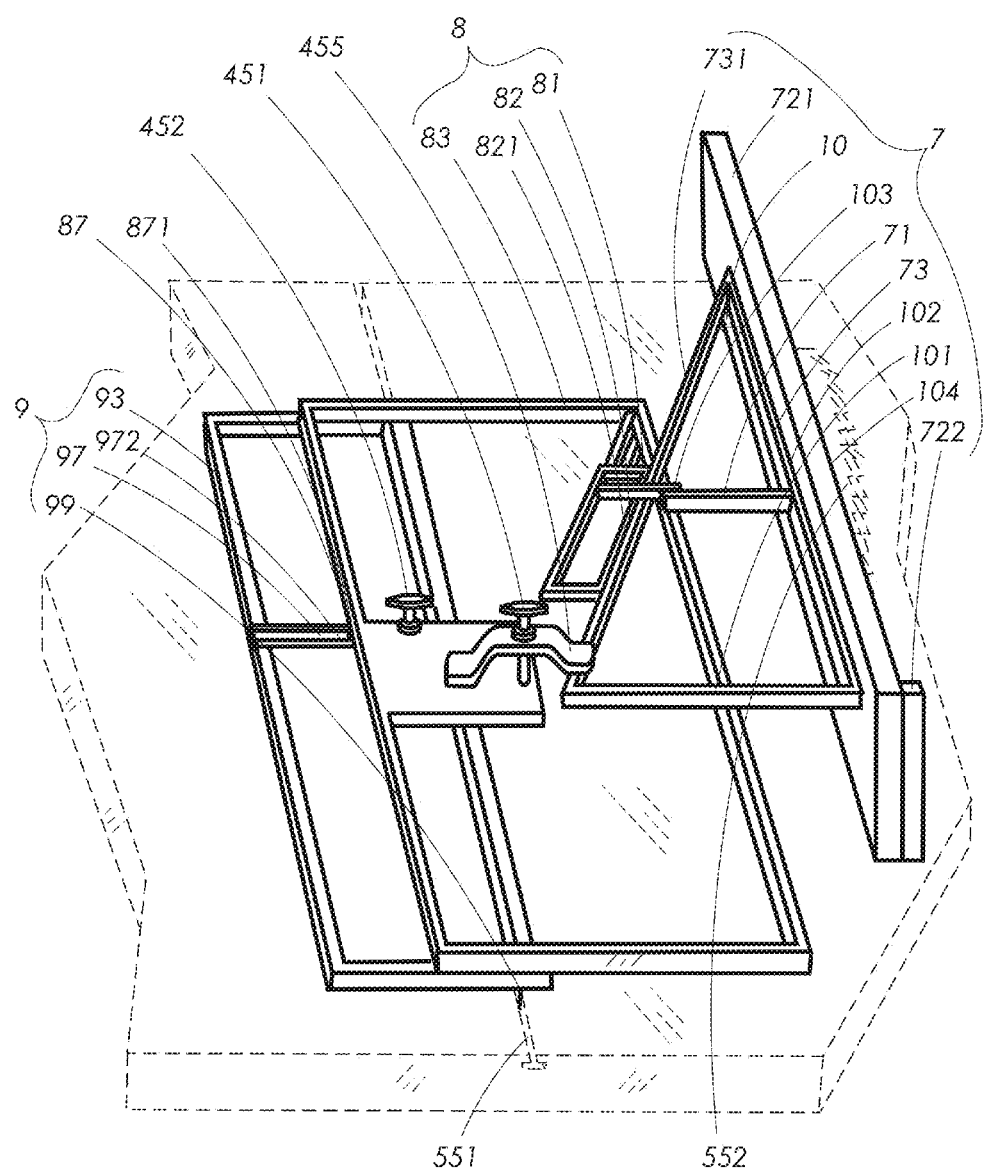
FIG. 30 comprises a perspective view of an assembly embodied as a framework (73, 83, 93), as distinguished from those comprising the plate-like body (13, 23,33) constructions otherwise addressed herein.

The structure of the inventive assembly need not be configured with plate-like constituents but, rather, as a weight reduction measure, be constructed as a framework (73, 83, 93) as that shown in FIG. 30, in which the components are disposed and function in the same manner as with the plate-like structures. If desired, the assembly may comprise a combination of the more solid plate-like components and partial framework constructions. In paralleling the structure of the assembly comprising plate-like bodies (13, 23, 33), the framework assembly also comprises the same following constituents disposed in the same manner as for the assembly comprising plate-like bodies (13, 23, 33), each of which should be considered to include a prefix "frame assembly—": A frame assembly's moveable component (7), a frame assembly's fixed component (8), a frame assembly's displacement accommodating component (9), a frame assembly's jig determined angle (10), a frame assembly's moveable curb (71), a frame assembly's moveable component frame body (73), a frame assembly's fixed curb (81), a frame assembly's angle determinant means (82), a frame assembly's fixed component frame body (83), a frame assembly's displacement accommodating component frame body (93), a frame assembly's displacement accommodating component's lateral translation means (97), a frame assembly's displacement accommodating component's longitudinal translation rail (99), a frame assembly's moveable component's sine related side (101), a frame assembly's moveable component's cosine related side (102), a frame assembly's guide fence (721), a frame assembly's stabilizing abutment stop (722), a frame assembly's moveable component's running abutment edge (731), a frame assembly's angled abutment ridge (821), a frame assembly's pass-through opening for a clamp (856) a frame assembly's lateral translation rail (871) a frame assembly's lateral translation channel (872), a frame assembly's displacement accommodating component's lateral translation rail (971) and a frame assembly's displacement accommodating component's lateral translation channel (972).

SEQUENCE LISTING

Not Applicable

The inventor hereby claims:

1. A trigonometric saw-cut centering jig assembly disposed for use upon the saw table of a powered table saw comprising a saw blade disposed along a cutting plane and a longitudinal translation channel disposed parallel the cutting plane, the jig assembly comprising
   a moveable component;
   a fixed component; and
   a displacement accommodating component;
   the moveable component overlying the fixed component, the position of the moveable component set by clamp means to the fixed component; the moveable component comprising
   a plate comprising an upper surface and an underside;
   a moveable curb attached to the moveable component's plate;
   a guide fence disposed parallel the saw blade's cutting plane such that a workable piece to be cut positioned snugly against the guide fence and in alignment with the saw blade may be advanced along the saw blade's cutting plane longitudinally in a direction away from the operator and cut by operation thereof;
   the moveable component configured with a running abutment edge disposed at an angle from the saw blade's cutting plane; the moveable component, when released from its clamp means to the fixed component, manually moveable by advancement longitudinally in a direction away from the operator and withdrawal longitudinally in a direction toward the operator parallel the saw blade's cutting plane, a distance of longitudinal advancement or withdrawal defined herein as a longitudinal displacement adjusting factor;
   the fixed component overlying the displacement accommodating component, interconnected to it by clamp means, and comprising
      a plate comprising an upper surface and an underside; and
      a fixed curb attached to the fixed component's plate and disposed in the manner of a stop wherein as the moveable component is advanced along the saw blade's cutting plane longitudinally in a direction away from the operator, a portion of the moveable curb is brought into abutment with a portion of the fixed curb;
   the fixed component configured with an angled abutment ridge disposed at the same angle from the saw blade's cutting plane as that of the moveable component's running edge;
   the displacement accommodating component comprising
      a plate comprising an upper surface and an underside; and
      a longitudinal translation rail mated to and interconnected with the saw table's longitudinal translation channel such that the displacement accommodating component may be repositioned upon the saw table parallel the saw blade's cutting plane and set by clamp means therefor;
   the moveable component disposed by positioning it with its running abutment edge in contact with the fixed component's angled abutment ridge such that upon advancing the moveable component along the saw blade's cutting plane longitudinally in a direction away from the operator or withdrawing it along the saw blade's cutting plane longitudinally in a direction toward the operator, in a direction parallel the cutting plane of the saw blade, to position the moveable component for the saw's cutting operation, the advancement or withdrawal conforms only to a path provided by the angular disposition of the moveable component's running abutment edge and the disposition of the fixed component's angled abutment ridge with which it remains in contact during the moveable component's advancement or withdrawal, the angle so provided defining a jig assembly's angle determinant means, wherein the angle so determined comprises one of a triangle in which the moveable component's running abutment edge and the fixed component's angled abutment ridge with which it remains in contact comprises a triangle's side disposed angularly away from the saw blade and represents the hypotenuse of the triangle, the longitudinal distance of advancement or withdrawal in a direction parallel the plane of the saw blade represents the adjacent side of the triangle and the distance of lateral displacement from the saw blade represents the opposite side of the triangle; and wherein further, the trigonometric sine of the angle so determined is equal to the opposite side of the triangle divided by the hypotenuse and the trigonometric cosine of the angle so determined is equal to the adjacent side of the triangle divided by the hypotenuse;
   such that as the moveable component is moved, respectively, toward or away from the operator, the guide fence is moved, respectively, toward or displaced from the saw blade effecting a separation distance therefrom, transverse the saw blade's cutting plane, the separation distance herein defined as the lateral displacement adjusting factor; the movements represented by angular vectors wherein the distance of the moveable component's advancement or withdrawal is represented by a longitudinally disposed vector comprising a first side of a right triangle; and the transverse separation distance between the moveable component's fence and the saw blade is represented by a laterally disposed vector comprising a second side of the triangle, the interior angle between the first and second sides comprising a right angle; and a projection of the angle determinant means intersecting the first and second sides comprising a third side of a represented right triangle representing the hypotenuse thereof; the first side thereof representing a cosine related side and the second side thereof representing a sine related side; the vertex of the angle measured between the angle determinant means and the plane of the saw blade comprising the most longitudinally distal portion of the right triangle; wherein further, upon advancing the moveable curb such that it is brought together in abutment with the fixed curb, providing a longitudinal displacement adjusting factor of zero, the moveable component may be laterally repositioned with reference to the displacement accommodating component such that the guide fence is caused to abut the saw blade, providing a lateral displacement adjusting factor of zero; whereupon a workable piece may be positioned with its width disposed snugly between the curbs, providing a longitudinal displacement adjusting factor equal to the distance between the curbs, thereby laterally displacing the guide fence from the saw blade a distance comprising by reason of the angle measured between the angle determinant means and the plane of the saw blade and the sine and cosine values for that angle, a lateral displacement adjusting factor comprising the product of the longitudinal displacement adjusting factor and a fraction equal to the ratio of the sine value for the angle measured between the angle determinant means and the plane of the saw blade to the cosine value therefor, wherein the workable piece may be positioned such that a corresponding fraction of its width is disposed between the guide fence and the saw blade.

2. The trigonometric saw-cut centering jig assembly according to claim 1 wherein the fixed component comprises lateral translation means to position the fixed component upon the displacement accommodating component, the position set by clamp means of interconnection; and the displacement accommodating component comprises lateral translation means mated to the fixed component's lateral translation means by reason of their interconnection.

3. The trigonometric saw-cut centering jig assembly according to claim 1 wherein the angle measured between the angle determinant means and the plane of the saw blade equals 26.565 degrees, thereby conferring upon the represented right triangle a sine value of 0.447 and a cosine value of 0.894 and, consequently, a lateral displacement adjusting factor equal to one-half the width of the workable piece, thereby positioning the workable piece's vertical centerline in alignment adjacent the saw blade's cutting plane.

4. The trigonometric saw-cut centering jig assembly according to claim 1 wherein the configuration of the moveable component's plate itself is that of a right triangle, comprising a distal first interior angle; a second interior angle comprising the right angle proximally disposed along a side parallel the saw blade; the third interior angle laterally disposed to the right angle; wherein the side adjacent the distal interior angle and running to the right angle comprises the triangle's cosine related side, the side opposite the right angle comprises the triangle's hypotenuse and the side opposite the distal angle comprises the triangle's sine related side; wherein the right triangle's distal interior angle equals 26.565 degrees, the side opposite the distal interior angle equal in length to one-half the length of the side adjacent the distal interior angle by reason the 0.447 sine and 0.894 cosine values of that angle.

5. The trigonometric saw-cut centering jig assembly according to claim 1 further comprising a spacer assembly attached to the upper surface of the fixed component's plate and disposed proximate the fixed component's fixed curb also attached to that surface, the spacer assembly in turn comprising a vertically pivotable spacer disposed upon a pivot axle and comprising width selected to equal that of a given mortise cutting chisel;

an adjustment block comprising a translation rail and translation channel as means to displace the spacer from the fixed curb;

the vertically pivotable spacer disposed adjacent the fixed component's fixed curb, such that it may be vertically pivoted downward upon the upper surface of the fixed component's plate, thereby interposing its width between the moveable curb and the fixed curb; wherein the moveable curb is prevented upon advancement parallel the saw blade's cutting plane from abutting the fixed curb but caused instead to abut the pivotable spacer, wherein the workable piece may be positioned with its width disposed snugly between the spacer and the moveable curb, increasing the longitudinal displacement adjustment factor by the width of the vertically pivotable spacer, the longitudinal displacement adjusting factor equal to the distance between the curbs; wherein the guide fence is correspondingly displaced laterally from the saw blade a distance comprising a lateral displacement adjusting factor comprising the product of the longitudinal displacement adjusting factor and a fraction equal to the ratio of the sine value for the jig determined angle to the cosine value therefor wherein emplacement of the piece snugly adjacent the guide fence with its face disposed for cutting comprises for it a redetermined centerline aligned adjacent the saw blade's cutting plane such that the portion of the face disposed between the guide fence and the saw blade's cutting plane equals the lateral displacement adjusting factor;

wherein the vertically pivotable spacer may also be repositioned to account for a chisel of a different width than that otherwise used; so as to alter the longitudinal displacement adjustment factor, the repositioned disposition of spacer displacement from the fixed curb set by clamp means therefor.

6. The trigonometric saw-cut centering jig assembly according to claim 5 wherein the angle measured between the angle determinant means and the plane of the saw blade equals 26.565 degrees, thereby conferring upon the represented right triangle a sine value of 0.447 and a cosine value of 0.894 and, consequently, a redetermined lateral displacement adjusting factor equal to one-half the widths of the workable piece and the vertically pivotable spacer combined, thereby positioning a redetermined centerline of the workable piece in alignment adjacent the saw blade's cutting plane such that the portion of the face disposed between the guide fence and the saw blade's cutting plane equals a redetermined lateral displacement adjusting factor equal to one-half the longitudinal displacement adjusting factor for the combined widths of the workable material and the vertically pivotable spacer; wherein a tenon matching the width of a mortise may be cut from the workable piece wherein the saw blade is caused to cut a first cheek of the tenon and, upon afterward rotating the workable piece 180 degrees, to cut a second cheek thereof, the two cuts, by reason of a redetermined longitudinal displacement adjusting factor for the combined workable piece and spacer width, forming a tenon of precise spacer width.

7. The trigonometric saw-cut centering jig assembly according to claim 1 wherein the clamp means setting the position of the fixed component upon the displacement accommodating component extends upwards through a clamp opening further comprised by the fixed component.

8. The trigonometric saw-cut centering jig assembly according to claim 1 wherein the fixed component further comprises a clamp adjustment translation slot disposed transverse the saw blade's cutting plane and extending through the fixed component's plate; and the clamp means setting the position of the fixed component upon the displacement accommodating component extends upwards through the fixed component's clamp adjustment translation slot;

wherein lateral clearance for fixed component to displacement accommodating component clamp means is provided and lateral alignment is maintained during the fixed component's lateral translation.

9. The trigonometric saw-cut centering jig assembly according to claim 1 wherein the clamp means setting the position of the moveable component upon the fixed component extends upwards through a clamp opening further comprised by the fixed component.

10. The trigonometric saw-cut centering jig assembly according to claim 1 wherein the moveable component comprises a clamp adjustment translation slot disposed in a direction equal to the jig determined angle and extending through the moveable component's plate;

and the clamp means setting the position of the moveable component upon the fixed component extends upwards through the moveable component's clamp adjustment translation slot;

wherein the moveable component to fixed component clamp means may be freely moved during advancement and withdrawal of the moveable component in a direction parallel the saw blade's cutting plane.

11. The trigonometric saw-cut centering jig assembly according to claim 2 wherein the fixed component's lateral translation means comprises a lateral translation rail and the displacement accommodating component's lateral translation means comprises a lateral translation channel.

12. The trigonometric saw-cut centering jig assembly according to claim 1 wherein the attachment of the moveable curb to the moveable component's plate and the attachment of the fixed curb to the fixed component's plate is upon the upper surface of each, respectively.

13. The trigonometric saw-cut centering jig assembly according to claim 1 wherein the angle determinant means is configured and disposed such that the fixed component comprises an angled abutment ridge disposed at an angle with reference to the saw blade's cutting plane of 26.565 degrees and the moveable component further comprises a running abutment edge disposed at that same angle, the abutment ridge and the moveable component's running abutment edge disposed in contiguity with one another such that as the moveable component is advanced or withdrawn parallel the saw blade's cutting plane, the moveable component's running abutment edge conforms only to the path of angular translation provided along its juncture with the fixed component's abutment ridge.

14. The trigonometric saw-cut centering jig assembly according to claim 1 wherein the angle determinant means is disposed and configured such that both the moveable component and the fixed component comprise angular rail and channel translation means each mated to the other and disposed at an angle measured clockwise with reference to the saw blade's cutting plane of 26.565 degrees, such that as the moveable component is advanced or withdrawn parallel the saw blade's cutting plane, the moveable component's angular rail and channel translation means conforms only to the path of angular translation provided by the fixed component's angular rail and channel translation means.

15. The trigonometric saw-cut centering jig assembly according to claim 14 wherein the fixed component's angular rail and channel translation means comprises an upwardly extending angular translation rail disposed upon its upper surface and underlying the moveable component and the moveable component's rail and channel translation means comprises an angular translation channel within the underside thereof, the angular translation rail disposed in angular alignment and fitting with the angular translation channel such that as the moveable component is advanced or withdrawn parallel the saw blade's cutting plane, the fixed component's angular translation rail conforms only to the path of the moveable component's angular translation channel.

16. The trigonometric saw-cut centering jig assembly according to claim 1 wherein the angle determinant means is disposed and configured such that both the moveable component and the fixed component comprise angular translation projection fingers and channel translation means each mated to the other and disposed at an angle measured with reference to the saw blade's cutting plane of 26.565 degrees, such that as the moveable component is advanced in a direction away from the operator or withdrawn in a direction toward the operator parallel the saw blade's cutting plane, the moveable component's angular projection finger and channel translation means conforms only to the path of angular translation provided by the fixed component's angular projection fingers and channel translation means.

17. The trigonometric saw-cut centering jig assembly according to claim 16 wherein the fixed component's angle determinant means comprises one or more upwardly extending angular translation fingers disposed upon its upper surface and underlying the moveable component and the moveable component's projection finger and channel translation means comprises an angular translation channel within the underside thereof, the angular translation fingers disposed in angular alignment and fitting with the angular translation channel such that as the moveable component is advanced in a direction away from the operator or withdrawn in a direction toward the operator parallel the saw blade's cutting plane, the fixed component's angular translation fingers conform only to the path of the fixed component's angular translation projection fingers.

18. The trigonometric saw-cut centering jig assembly according to claim 9 wherein the moveable component, when adjustably positioned for use is joined to the fixed component by clamp means additionally comprising a straddling clamp brace.

19. A trigonometric saw-cut centering jig assembly disposed for use upon the saw table of a powered table saw comprising a saw blade disposed along a cutting plane and a longitudinal translation channel disposed parallel the cutting plane, the jig assembly comprising a moveable component;
a fixed component; and
a displacement accommodating component;

the moveable component overlying the fixed component, the position of the moveable component set by clamp means to the fixed component; the moveable component comprising a frame body comprising an upper surface and an underside;
a moveable curb attached to the moveable component's frame body;
a guide fence disposed parallel the saw blade's cutting plane such that a workable piece to be cut positioned snugly against the guide fence and in alignment with the saw blade may be advanced along the saw blade's cutting plane longitudinally in a direction away from the operator and cut by operation thereof;

the moveable component configured with a running abutment ridge disposed at an angle from the saw blade's cutting plane; the moveable component, when released from its clamp means to the fixed component, manually moveable by advancement longitudinally in a direction away from the operator and withdrawal longitudinally in a direction toward the operator parallel the saw blade's cutting plane, a distance of longitudinal advancement or withdrawal defined herein as the longitudinal displacement adjusting factor;

the fixed component overlying the displacement accommodating component, interconnected to it by clamp means, and comprising a frame body comprising an upper surface and an underside;

a fixed curb attached to the fixed component's frame body and disposed in the manner of a stop wherein as the moveable component is advanced along the saw blade's cutting plane longitudinally in a direction away from the operator, a portion of the moveable curb is brought into abutment with a portion of the fixed curb;

the fixed component configured with an angled abutment ridge disposed at the same angle from the saw blade's cutting plane as that of the moveable component's running edge;

lateral translation means to position the fixed component upon the displacement accommodating component, the position set by clamp means of interconnection;

the displacement accommodating component comprising a frame body comprising an upper surface and an underside;

lateral translation means mated to the fixed component's lateral translation means by reason of their interconnection; and a longitudinal translation rail mated to and interconnected with the saw table's longitudinal translation channel such that the displacement accommodating component may be repositioned upon the saw table parallel the saw blade's cutting plane and set by clamp means therefor;

the moveable component disposed by positioning it with its running abutment edge in contact with the fixed component's angled abutment ridge such that upon advancing the moveable component along the saw blade's cutting plane longitudinally in a direction away from the operator or withdrawing it along the saw blade's cutting plane longitudinally in a direction toward the operator, in a direction parallel the cutting plane of the saw blade, to position the moveable component for the saw's cutting operation, the advancement or withdrawal conforms only to a path provided by the angular disposition of the moveable component's running abutment edge and the disposition of the fixed component's angled abutment ridge with which it remains in contact during the moveable component's advancement or withdrawal, the angle so provided defining a jig assembly's angle determinant means, wherein the angle so determined comprises one of a triangle in which the moveable component's running abutment edge and the fixed component's angled abutment ridge with which it remains in contact comprises a triangle's side disposed angularly away from the saw blade and represents the hypotenuse of the triangle, the longitudinal distance of advancement or withdrawal in a direction parallel the plane of the saw blade represents the adjacent side of the triangle and the distance of lateral displacement from the saw blade represents the opposite side of the triangle; and wherein further, the trigonometric sine of the angle so determined is equal to the opposite side of the triangle divided by the hypotenuse and the trigonometric cosine of the angle so determined is equal to the adjacent side of the triangle divided by the hypotenuse;

such that as the moveable component is moved, respectively, toward or away from the operator, the guide fence is moved, respectively, toward or displaced from the saw blade effecting a separation distance therefrom, transverse the saw blade's cutting plane, the separation distance herein defined as the lateral displacement adjusting factor; the movements represented by angular vectors wherein the distance of the moveable component's advancement or withdrawal is represented by a longitudinally disposed vector comprising a first side of a right triangle; and the transverse separation distance between the moveable component's fence and the saw blade is represented by a laterally disposed vector comprising a second side of the triangle, the interior angle between the first and second sides comprising a right angle; and a projection of the angle determinant means intersecting the first and second sides comprising a third side of a represented right triangle representing the hypotenuse thereof; the first side thereof representing a cosine related side and the second side thereof representing a sine related side; the vertex of the angle measured between the angle determinant means and the plane of the saw blade comprising the most longitudinally distal portion of the right triangle; wherein further, upon advancing the moveable curb such that it is brought together in abutment with the fixed curb, providing a longitudinal adjusting factor of zero, the moveable component may be laterally repositioned with reference to the displacement accommodating component such that the guide fence is caused to abut the saw blade, providing a lateral adjusting factor of zero;

whereupon a workable piece may be positioned with its width disposed snugly between the curbs, providing a longitudinal displacement factor equal to the distance between the curbs, thereby laterally displacing the guide fence from the saw blade a distance comprising by reason of the angle measured between the angle determinant means and the plane of the saw blade and the sine and cosine values for that angle, a lateral displacement adjusting factor comprising the product of the longitudinal displacement adjusting factor and a fraction equal to the ratio of the sine value for the measured between the angle determinant means and the plane of the saw blade to the cosine value therefor, wherein the workable piece may be positioned such that a corresponding fraction of its width is disposed between the guide fence and the saw blade.

20. The trigonometric saw-cut centering jig assembly according to claim 19 wherein the jig determined angle equals 26.565 degrees, thereby conferring upon the represented right triangle a sine value of 0.447 and a cosine value of 0.894 and, consequently, a redetermined lateral displacement adjusting factor equal to one-half the widths of the workable piece and the vertically pivotable spacer combined, thereby positioning the workable piece's redetermined centerline in alignment adjacent the saw blade's cutting plane such that the portion of the face disposed between the guide fence and the saw blade's cutting plane equals a redetermined lateral displacement adjusting factor equal to one-half the longitudinal displacement adjusting factor for the combined widths of the workable material and the vertically pivotable spacer; wherein a tenon matching the width of a mortise may be cut from the workable piece wherein the saw blade is caused to cut a first cheek of the tenon and, upon afterward rotating the workable piece 180 degrees, to cut a second cheek thereof, the two cuts, by reason of a redetermined longitudinal displacement adjusting factor for the combined workable piece and spacer widths, forming a tenon of precise spacer width.

* * * * *